(12) United States Patent
Chao et al.

(10) Patent No.: US 12,007,960 B2
(45) Date of Patent: Jun. 11, 2024

(54) METHODS MAKE WEB AND BUSINESS APPLICATION DATA ACCESS AGNOSTIC TO SCHEMA VARIATIONS AND MIGRATIONS

(71) Applicant: Dell Products L.P., Round Rock, TX (US)

(72) Inventors: Ching-Yun Chao, Austin, TX (US); Steve Petrucci, Bellevue, WA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/726,781

(22) Filed: Apr. 22, 2022

(65) Prior Publication Data
US 2023/0342339 A1    Oct. 26, 2023

(51) Int. Cl.
*G06F 16/21* (2019.01)
*G06F 16/28* (2019.01)
*H04L 67/00* (2022.01)

(52) U.S. Cl.
CPC .......... *G06F 16/211* (2019.01); *G06F 16/284* (2019.01); *H04L 67/34* (2013.01)

(58) Field of Classification Search
CPC ....... G06F 16/211; G06F 16/284; H04L 67/34
USPC .......................................................... 707/803
See application file for complete search history.

(56) References Cited

U.S. PATENT DOCUMENTS

| | | | |
|---|---|---|---|
| 10,044,522 B1 * | 8/2018 | Shamis | ............... H04L 41/0893 |
| 10,353,719 B2 | 7/2019 | Kaimal et al. | |
| 10,467,243 B2 | 11/2019 | Liu et al. | |
| 10,691,682 B2 | 6/2020 | LeGault et al. | |
| 11,341,317 B2 | 5/2022 | Liu et al. | |
| 11,423,001 B2 | 8/2022 | Liu et al. | |
| 11,475,034 B2 | 10/2022 | Wu et al. | |
| 2004/0133672 A1 * | 7/2004 | Bhattacharya | ...... H04L 63/1416 709/224 |
| 2005/0055355 A1 * | 3/2005 | Murthy | ................... G06F 16/84 |

(Continued)

OTHER PUBLICATIONS

Baazizi et al., Schema Inference for Massive JSON Datasets, (Year: 2017).

(Continued)

*Primary Examiner* — Kuen S Lu
(74) *Attorney, Agent, or Firm* — Terrile, Cannatti & Chambers, LLP; Stephen A. Terrile

(57) ABSTRACT

A system, method, and computer-readable medium are disclosed for performing a data schema mapping operation. The data schema mapping operation includes receiving product information from a product supplier, the product information comprising a first document corresponding to a first data schema, the first data schema comprising an unspecified JavaScript Object Notation (JSON) schema; identifying a plurality of components within the first document corresponding to the first data schema, the plurality of components comprising JSON data elements; identifying a second plurality of components corresponding to a second data schema, the second data schema comprising a defined data schema, the second data schema being associated with a data center services provider, at least some of the second plurality of components being associated with a relational database; and, mapping a component of the document corresponding to the first data schema to a component corresponding to the second data schema.

20 Claims, 11 Drawing Sheets

(56) References Cited

U.S. PATENT DOCUMENTS

| | | |
|---|---|---|
| 2013/0187926 A1 | 7/2013 | Silverstein et al. |
| 2014/0067866 A1 | 3/2014 | Chen |
| 2016/0055184 A1 | 2/2016 | Fokoue-Nkoutche et al. |
| 2017/0060973 A1 | 3/2017 | Liu et al. |
| 2017/0091265 A1* | 3/2017 | Cao .................... G06F 16/2423 |
| 2017/0109150 A1 | 4/2017 | Davies |
| 2017/0371881 A1 | 12/2017 | Reynolds et al. |
| 2018/0262864 A1 | 9/2018 | Reynolds et al. |
| 2019/0050445 A1 | 2/2019 | Griffith et al. |
| 2021/0109629 A1 | 4/2021 | Reynolds et al. |
| 2021/0118054 A1 | 4/2021 | Turner et al. |
| 2021/0234713 A1* | 7/2021 | Nagasawa ........... H04L 12/1435 |
| 2021/0271678 A1 | 9/2021 | Chamarthy et al. |
| 2021/0350065 A1 | 11/2021 | Freundlich et al. |
| 2022/0138328 A1* | 5/2022 | Weber .................. G06F 21/602 |
| | | 713/165 |
| 2022/0240085 A1* | 7/2022 | Long .................. H04W 40/246 |
| 2023/0041129 A1 | 2/2023 | Terlecki et al. |
| 2023/0109718 A1 | 4/2023 | Polen et al. |

OTHER PUBLICATIONS

Izquierdo et al., Discovering Implicit Schemas in JSON Data, (Year: 2013).

Baazizi et al., Schemas and Types for JSON Data: From Theory to Practice, (Year: 2019).

* cited by examiner

METHODS MAKE WEB AND BUSINESS APPLICATION DATA ACCESS AGNOSTIC TO SCHEMA VARIATIONS AND MIGRATIONS

BACKGROUND OF THE INVENTION

Field of the Invention

The present invention relates to information handling systems. More specifically, embodiments of the invention relate to performing a data schema mapping operation.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment the invention relates to a method for performing a data schema mapping operation, comprising: receiving product information from a product supplier, the product information comprising a first document corresponding to a first data schema, the first data schema comprising an unspecified JavaScript Object Notation (JSON) schema; identifying a plurality of components within the first document corresponding to the first data schema, the plurality of components comprising JSON objects; identifying a second plurality of components corresponding to a second data schema, the second data schema comprising a defined data schema, the second data schema being associated with a services provider, at least some of the second plurality of components being associated with a relational database; and, mapping a component of the document corresponding to the first data schema to a component corresponding to the second data schema.

In another embodiment the invention relates to a system comprising: a processor; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for: receiving product information from a product supplier, the product information comprising a first document corresponding to a first data schema, the first data schema comprising an unspecified JavaScript Object Notation (JSON) schema; identifying a plurality of components within the first document corresponding to the first data schema, the plurality of components comprising JSON data elements; identifying a second plurality of components corresponding to a second data schema, the second data schema comprising a defined data schema, the second data schema being associated with a data center services provider, at least some of the second plurality of components being associated with a relational database; and, mapping a component of the document corresponding to the first data schema to a component corresponding to the second data schema.

In another embodiment the invention relates to a computer-readable storage medium embodying computer program code, the computer program code comprising computer executable instructions configured for: receiving product information from a product supplier, the product information comprising a first document corresponding to a first data schema, the first data schema comprising an unspecified JavaScript Object Notation (JSON) schema; identifying a plurality of components within the first document corresponding to the first data schema, the plurality of components comprising JSON data elements; identifying a second plurality of components corresponding to a second data schema, the second data schema comprising a defined data schema, the second data schema being associated with a services provider, at least some of the second plurality of components being associated with a relational database; and, mapping a component of the document corresponding to the first data schema to a component corresponding to the second data schema.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
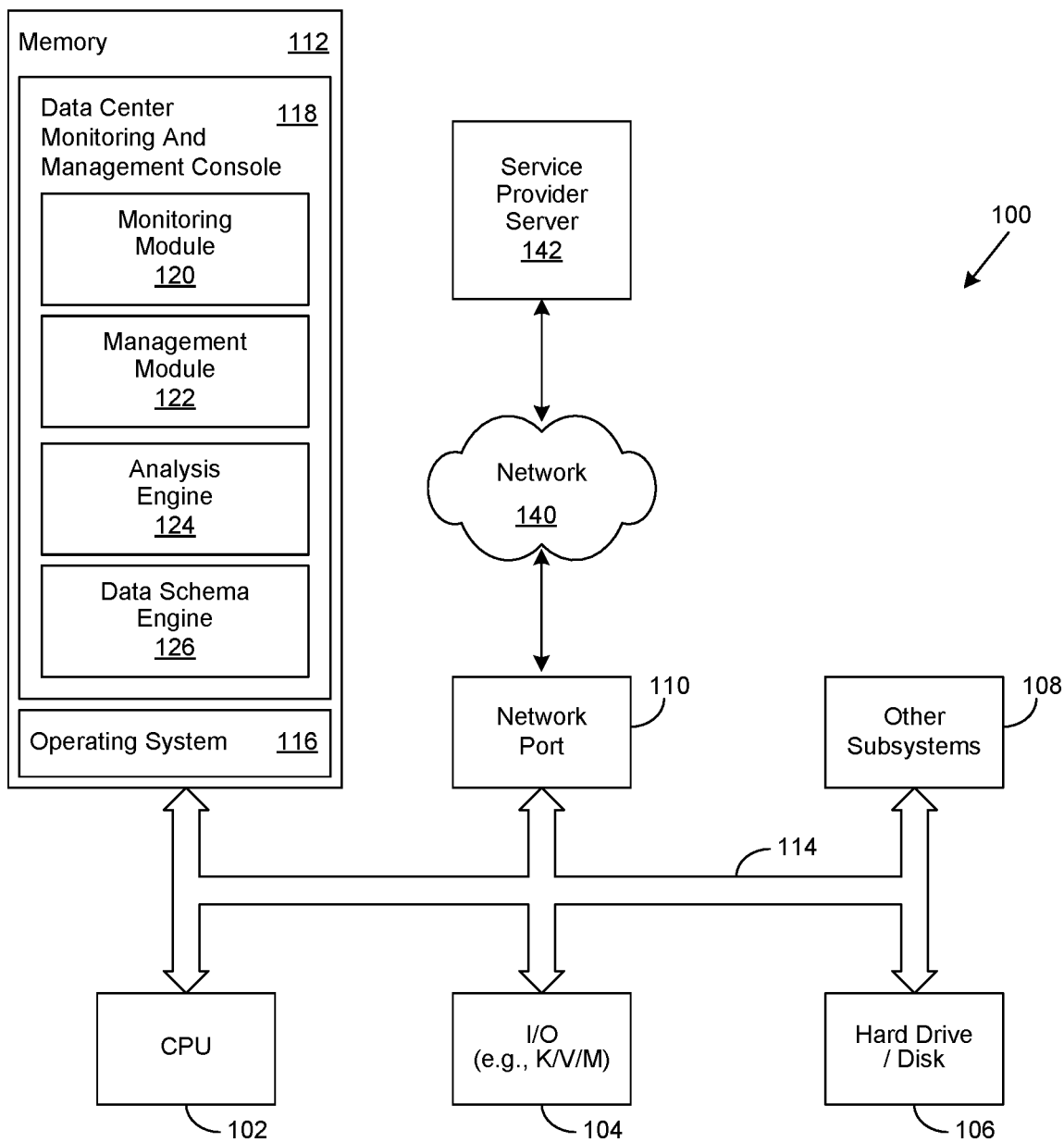
FIG. 1 shows a general illustration of components of an information handling system as implemented in the system and method of the present invention.

A system, method, and computer-readable medium are disclosed for performing a data schema mapping operation. Various aspects of the invention reflect an appreciation that it is common for a typical datacenter to monitor and manage many different assets, such as certain computing and networking devices, described in greater detail herein. Certain aspects of the invention likewise reflect an appreciation that such data center assets are typically implemented to work in combination with one another for a particular purpose. Likewise, various aspects of the invention reflect an appreciation that such purposes generally involve the performance of a wide variety of tasks, operations, and processes to service certain workloads.

Various aspects of the invention reflect an appreciation that it is common for a manufacturer of a product to provide certain associated product information to its purchasers, or users, or both. Likewise, certain aspects of the invention reflect an appreciation that such information may be digitally provided in the form of a JavaScript Object Notation (JSON) document. However, certain aspects of the invention likewise reflect that the data schema of such JSON documents may vary from one manufacturer to another. As an example, two manufacturers of hard disk drives (HDDs) may respectively use two different JSON data schemas when providing information corresponding to the same attributes of the products they may respectively manufacture, such as storage capacity, form factor, seek times, data transfer rates, and so forth.

Furthermore, the recipient of such JSON documents may use one or more other JSON data schemas for their own use. To continue the prior example, a provider of data center services may use one JSON data schema for product information associated with certain operational aspects of various data center assets, described in greater detail herein. In turn, such data center asset operational information may be used internally by a data center asset monitoring and management console, likewise described in greater detail herein.

Likewise, the data center services provider may use another JSON data schema for data center asset documentation, and yet another JSON data schema for product information used to resolve a particular data center issue. Still yet another JSON schema may be used for maintaining a product catalog of services that are offered, which may in turn be presented on a web page for public consumption. Accordingly, the product information received from the two HDD manufacturers may require mapping from their respective JSON data schemas to whichever JSON data schema may be used by the provider of data center services for a particular purpose.

Certain aspects of the invention likewise reflect an appreciation that it is common to use a document-oriented database, such as MongoDB™, to manage JSON document storage and access. Furthermore, the use of such document-oriented databases expect client applications to understand a JSON document's data schema and how to most effectively retrieve the data attributes it contains, which often requires the development of customized application or web page code. Moreover, the scalability design of document-oriented databases are based upon an eventual consistency model that assumes most accesses are read-only, which adds constraints to application and web page design and difficulty to their implementation.

Accordingly, certain aspects of the invention reflect an appreciation that shielding differences in JSON data schemas from web page and application logic, such as through the use of schema-agnostic data access Application Program Interfaces (APIs), would be advantageous. Likewise, certain aspects of the invention reflect an appreciation that shielding changes to a particular JSON data schema would also be advantageous, whether such changes occur infrequently or on a recurring basis. Various aspects of the invention likewise reflect an appreciation that it may be advantageous to map certain data elements associated with a JSON data schema to the schema implemented for use by a relational database management system (RDBMS).

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, a touchpad or touchscreen, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a data center monitoring and management console 118. In one embodiment, the information handling system 100 is able to download the data center monitoring and management console 118 from the service provider server 142. In another embodiment, the data center monitoring and management console 118 is provided as a service from the service provider server 142.

In certain embodiments, the data center monitoring and management console 118 may include a monitoring module 120, a management module 122, an analysis engine 124, and a data schema engine 126, or a combination thereof. In certain embodiments, the data center monitoring and management console 118 may be implemented to perform a data center monitoring and management operation. In certain embodiments, the data center monitoring and management operation may be performed during operation of an information handling system 100. In various embodiments, performance of the data center monitoring and management operation may result in the realization of improved monitoring and management of certain data center assets, as described in greater detail herein. In certain embodiments, the data schema engine 126 may be implemented to perform a data schema mapping operation, described in greater detail herein.

Figure 2:
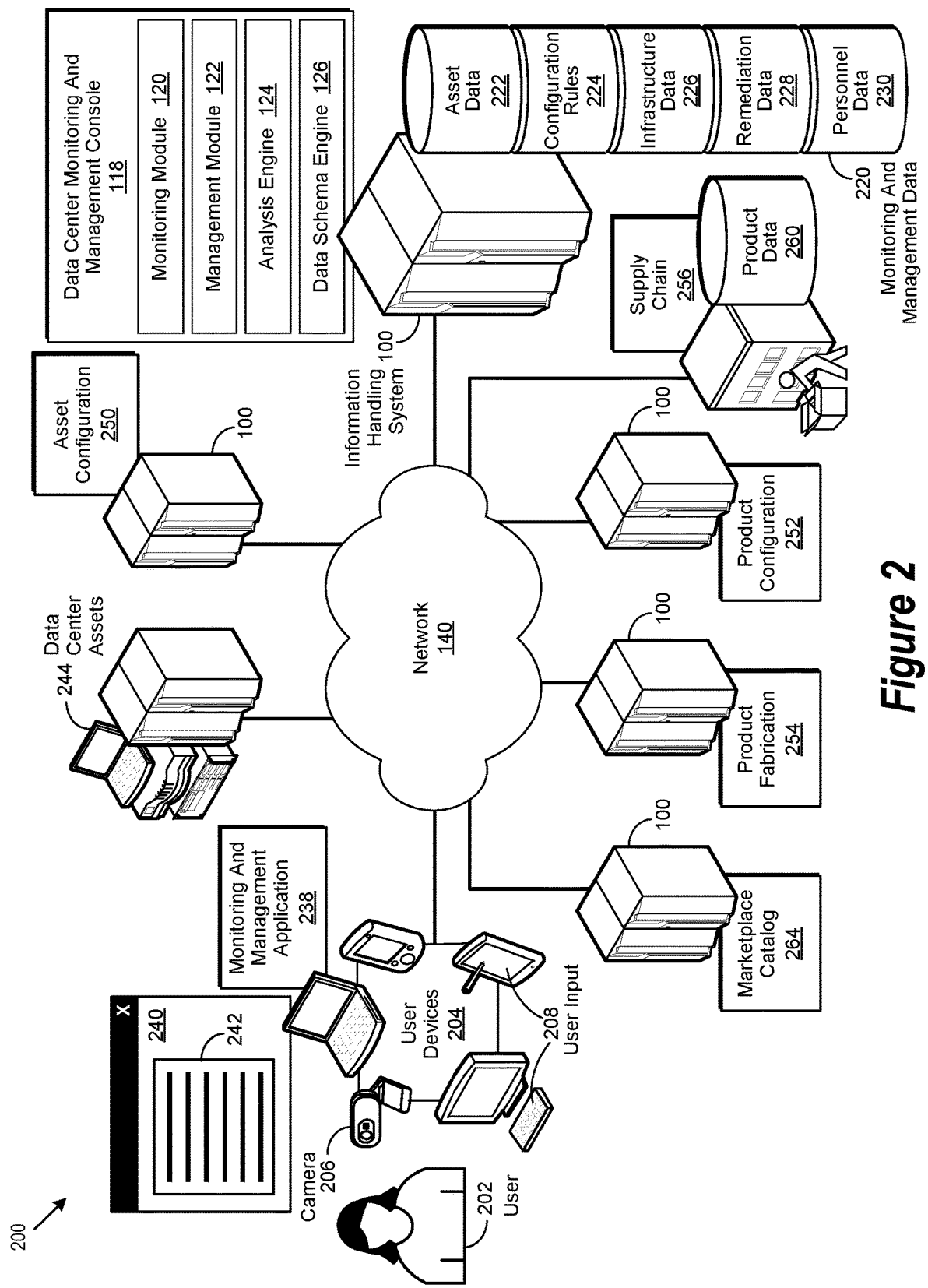
FIG. 2 shows a block diagram of a data center system monitoring and management environment.

FIG. 2 is a simplified block diagram of a data center monitoring and management environment implemented in accordance with an embodiment of the invention. As used herein, a data center broadly refers to a building, a dedicated space within a building, or a group of buildings, used to house a collection of interrelated data center assets 244 implemented to work in combination with one another for a particular purpose. As likewise used herein, a data center asset 244 broadly refers to anything, tangible or intangible, that can be owned, controlled, or enabled to produce value as a result of its use within a data center. In certain embodiments, a data center asset 244 may include a product, or a service, or a combination of the two.

As used herein, a tangible data center asset 244 broadly refers to data center asset 244 having a physical substance, such as a computing or network device. Examples of computing devices may include personal computers (PCs), laptop PCs, tablet computers, servers, mainframe computers, Redundant Arrays of Independent Disks (RAID) storage units, their associated internal and external components, and so forth. Likewise, examples of network devices may include routers, switches, hubs, repeaters, bridges, gateways, and so forth. Other examples of a tangible data center asset 244 may include certain data center personnel, such as a data center system administrator, operator, or technician, and so forth. Other examples of a tangible data center asset 244 may include certain maintenance, repair, and operations (MRO) items, such as replacement and upgrade parts for a particular data center asset 244. In certain embodiments, such MRO items may be in the form of consumables, such as air filters, fuses, fasteners, and so forth.

As likewise used herein, an intangible data center asset 244 broadly refers to a data center asset 244 that lacks physical substance. Examples of intangible data center assets 244 may include software applications, software services, firmware code, and other non-physical, computer-based assets. Other examples of intangible data center assets 244 may include digital assets, such as structured and unstructured data of all kinds, still images, video images, audio recordings of speech and other sounds, and so forth. Further examples of intangible data center assets 244 may include intellectual property, such as patents, trademarks, copyrights, trade names, franchises, goodwill, and knowledge resources, such as data center asset 244 documentation. Yet other examples of intangible data center assets 244 may include certain tasks, functions, operations, procedures, or processes performed by data center personnel. Those of skill in the art will recognize that many such examples of tangible and intangible data center assets 244 are possible. Accordingly, the foregoing is not intended to limit the spirit, scope or intent of the invention.

In certain embodiments, the value produced by a data center asset 244 may be tangible or intangible. As used herein, tangible value broadly refers to value that can be measured. Examples of tangible value may include return on investment (ROI), total cost of ownership (TCO), internal rate of return (IRR), increased performance, more efficient use of resources, improvement in sales, decreased customer support costs, and so forth. As likewise used herein, intangible value broadly refers to value that provides a benefit that may be difficult to measure. Examples of intangible value may include improvements in user experience, customer support, and market perception. Skilled practitioner of the art will recognize that many such examples of tangible and intangible value are possible. Accordingly, the foregoing is not intended to limit the spirit, scope or intent of the invention.

In certain embodiments, the data center monitoring and management environment 200 may include a data center monitoring and management console 118. In certain embodiments, the data center monitoring and management console 118 may be implemented to perform a data center monitoring and management operation. As used herein, a data center monitoring and management operation broadly refers to any task, function, procedure, or process performed, directly or indirectly, within a data center monitoring and management environment 200 to procure, deploy, configure, implement, operate, monitor, manage, maintain, or remediate a data center asset 244.

In certain embodiments, a data center monitoring and management operation may include a data center monitoring task. As used herein, a data center monitoring task broadly refers to any function, operation, procedure, or process performed, directly or indirectly, within a data center monitoring and management environment 200 to monitor the operational status of a particular data center asset 244. In various embodiments, a particular data center asset 244 may be implemented to generate an alert if its operational status exceeds certain parameters. In these embodiments, the definition of such parameters, and the method by which they may be selected, is a matter of design choice.

For example, an internal cooling fan of a server may begin to fail, which in turn may cause the operational temperature of the server to exceed its rated level. In this example, the server may be implemented to generate an alert, which provides notification of the occurrence of a data center issue. As used herein, a data center issue broadly refers to an operational situation associated with a particular component of a data monitoring and management environment 200, which if not corrected, may result in negative consequences. In certain embodiments, a data center issue may be related to the occurrence, or predicted occurrence, of an anomaly within the data center monitoring and management environment 200. In certain embodiments, the anomaly may be related to unusual or unexpected behavior of one or more data center assets 244.

In certain embodiments, a data center monitoring and management operation may include a data center management task. As used herein, a data center management task broadly refers to any function, operation, procedure, or process performed, directly or indirectly, within a data center monitoring and management environment 200 to manage a particular data center asset 244. In certain embodiments, a data center management task may include a data center deployment operation, a data center remediation operation, a data center remediation documentation operation, a data schema mapping operation, or a combination thereof.

As used herein, a data center deployment operation broadly refers to any function, task, procedure, or process performed, directly or indirectly, within a data center monitoring and management environment 200 to install a software file, such as a configuration file, a new software application, a version of an operating system, and so forth, on a data center asset 244. As likewise used herein, a data center remediation operation broadly refers to any function, task, procedure, or process performed, directly or indirectly, within a data center monitoring and management environment 200 to correct an operational situation associated with a component of a data monitoring and management environment 200, which if not corrected, may result in negative consequences. A data center remediation documentation operation, as likewise used herein, broadly refers to any function, task, procedure, or process performed, directly or indirectly, within a data center monitoring and management environment 200 to retrieve, generate, revise, update, or store remediation documentation that may be used in the performance of a data center remediation operation. Likewise, as used herein, a data schema mapping operation (also referred to as a data content mapping operation) broadly refers to any task, function, procedure, or process performed, directly or indirectly, to map a component of one data schema to a component of another data schema. In certain embodiments, the data schema mapping operation maps a component from an unspecified data schema to a component of a defined data schema. As used herein, an unspecified data schema broadly refers to a data schema having a format which has not been defined by a recipient of a document conforming to the data schema. As used herein, a defined data schema broadly refers to a data schema conforming to a format prescribed by a particular entity, such as a service provider receiving a document from a product supplier.

In certain embodiments, the data center monitoring and management console 118 may be implemented to receive an alert corresponding to a particular data center issue. In various embodiments, the data center monitoring and management console 118 may be implemented to receive certain data associated with the operation of a particular data center asset 244. In certain embodiments, such operational data may be received through the use of telemetry approaches familiar to those of skill in the art. In various embodiments, the data center monitoring console 118 may be implemented to process certain operational data received from a particular data center asset to determine whether a data center issue has occurred, is occurring, or is anticipated to occur.

In certain embodiments, the data center monitoring and management console 118 may be implemented to include a monitoring module 120, a management monitor 122, an analysis engine 124, and a data schema engine 126, or a combination thereof. In certain embodiments, the monitoring module 120 may be implemented to monitor the procurement, deployment, implementation, operation, management, maintenance, or remediation of a particular data center asset 244 at any point in its lifecycle. In certain embodiments, the management module 122 may be implemented to manage the procurement, deployment, implementation, operation, monitoring, maintenance, or remediation of a particular data center asset 244 at any point in its lifecycle. In certain embodiments, the data schema engine 126 may be implemented to perform a data schema mapping operation, as described in greater detail herein. In various embodiments, the monitoring module 120, the management module 122, the analysis engine 124, and the data schema engine 126 may be implemented, individually or in combination with one another, to perform a data center asset monitoring and management operation, as likewise described in greater detail herein.

In certain embodiments, the data center monitoring and management environment 200 may include a repository of data center monitoring and management data 220. In certain embodiments, the repository of data center monitoring and management data 220 may be local to the information handling system 100 executing the data center monitoring and management console 118 or may be located remotely. In various embodiments, the repository of data center monitoring and management data 220 may include certain information associated with data center asset data 220, data center asset configuration rules 224, data center infrastructure data 226, data center remediation data 228, and data center personnel data 230.

As used herein, data center asset data 222 broadly refers to information associated with a particular data center asset 244, such as an information handling system 100, or an associated workload, that can be read, measured, and structured into a usable format. For example, data center asset data 222 associated with a particular server may include the number and type of processors it can support, their speed and architecture, minimum and maximum amounts of memory supported, various storage configurations, the number, type, and speed of input/output channels and ports, and so forth. In various embodiments, the data center asset data 222 may likewise include certain performance and configuration information associated with a particular workload, as described in greater detail herein. In various embodiments, the data center asset data 222 may include certain public or proprietary information related to data center asset 244 configurations associated with a particular workload.

In certain embodiments, the data center asset data 222 may include information associated with data center asset 244 types, quantities, locations, use types, optimization types, workloads, performance, support information, and cost factors, or a combination thereof, as described in greater detail herein. In certain embodiments, the data center asset data 222 may include information associated with data center asset 244 utilization patterns, likewise described in greater detail herein. In certain embodiments, the data center asset data 222 may include information associated with the allocation of certain data center asset resources, described in greater detail herein, to a particular workload.

As likewise used herein, a data center asset configuration rule 224 broadly refers to a rule used to configure a particular data center asset 244. In certain embodiments, one or more data center asset configuration rules 224 may be used to verify that a particular data center asset 244 configuration is the most optimal for an associated location, or workload, or to interact with other data center assets 244, or a combination thereof, as described in greater detail herein. In certain embodiments, the data center asset configuration rule 224 may be used in the performance of a data center asset configuration verification operation, a data center remediation operation, or a combination of the two. In certain embodiments, the data center asset configuration verification operation, or the data center remediation operation, or both, may be performed by an asset configuration system 250. In certain embodiments, the asset configuration system 250 may be used in combination with the data center monitoring and management console 118 to perform a data center asset configuration operation, or a data center remediation operation, or a combination of the two.

As used herein, data center infrastructure 226 data broadly refers to any data associated with a data center infrastructure component. As likewise used herein, a data center infrastructure component broadly refers to any component of a data center monitoring and management environment 200 that may be involved, directly or indirectly, in the procurement, deployment, implementation, configuration, operation, monitoring, management, maintenance, or remediation of a particular data center asset 244. In certain embodiments, data center infrastructure components may include physical structures, such as buildings, equipment racks and enclosures, network and electrical cabling, heating, cooling, and ventilation (HVAC) equipment and associated ductwork, electrical transformers and power conditioning systems, water pumps and piping systems, smoke and fire suppression systems, physical security systems and associated peripherals, and so forth. In various embodiments, data center infrastructure components may likewise include the provision of certain services, such as network connectivity, conditioned airflow, electrical power, and water, or a combination thereof.

Data center remediation data 228, as used herein, broadly refers to any data associated with the performance of a data center remediation operation, described in greater details herein. In certain embodiments, the data center remediation data 228 may include information associated with the remediation of a particular data center issue, such as the date and time an alert was received indicating the occurrence of the data center issue. In certain embodiments, the data center remediation data 228 may likewise include the amount of elapsed time before a corresponding data center remediation operation was begun after receiving the alert, and the amount of elapsed time before it was completed. In various embodiments, the data center remediation data 228 may include information related to certain data center issues, the frequency of their occurrence, their respective causes, error codes associated with such data center issues, the respective location of each data center asset 244 associated with such data center issues, and so forth.

In various embodiments, the data center remediation data 228 may include information associated with data center asset 244 replacement parts, or upgrades, or certain third party services that may need to be procured in order to perform the data center remediation operation. Likewise, in certain embodiments, related data center remediation data 228 may include the amount of elapsed time before the replacement parts, or data center asset 244 upgrades, or third party services were received and implemented. In certain embodiments, the data center remediation data 228 may include information associated with data center personnel who may have performed a particular data center remediation operation. Likewise, in certain embodiments, related data center remediation data 228 may include the amount of time the data center personnel actually spent performing the operation, issues encountered in performing the operation, and the eventual outcome of the operation that was performed.

In certain embodiments, the data center remediation data 228 may include remediation documentation associated with performing a data center asset remediation operation associated with a particular data center asset 244. In various embodiments, such remediation documentation may include information associated with certain attributes, features, characteristics, functional capabilities, operational parameters, and so forth, of a particular data center asset 244. In certain embodiments, such remediation documentation may likewise include information, such as step-by-step procedures and associated instructions, video tutorials, diagnostic routines and tests, checklists, and so forth, associated with remediating a particular data center issue.

In certain embodiments, the data center remediation data 228 may include information associated with any related remediation dependencies, such as other data center remediation operations that may need to be performed beforehand. In certain embodiments, the data center remediation data 228 may include certain time restrictions when a data center remediation operation, such as rebooting a particular server, may be performed. In various embodiments, the data center remediation data 228 may likewise include certain autonomous remediation rules, described in greater detail herein. In various embodiments, certain of these autonomous remediation rules may be used in the performance of an autonomous remediation operation, described in greater detail herein. Those of skill in the art will recognize that many such examples of data center remediation data 228 are possible. Accordingly, the foregoing is not intended to limit the spirit, scope, or intent of the invention.

Data center personnel data 230, as used herein, broadly refers to any data associated with data center personnel who may be directly, or indirectly, involved in the procurement, deployment, configuration, implementation, operation, monitoring, management, maintenance, or remediation of a particular data center asset 244. In various embodiments, the data center personnel data 230 may include job title, work assignment, or responsibility information corresponding to certain data center personnel. In various embodiments, the data center personnel data 230 may include information related to the type, and number, of data center remediation operations currently being, or previously, performed by certain data center personnel. In various embodiments, the data center personnel data 230 may include historical information, such as success metrics, associated with data center remediation operations performed by certain data center personnel, such as data center administrators, operators, and technicians. In these embodiments, the data center personnel data 230 may be updated as individual data center personnel complete each data center remediation task, described in greater detail herein, they are assigned.

In various embodiments, the data center personnel data 230 may likewise include education, certification, and skill level information corresponding to certain data center personnel. Likewise, in various embodiments, the data center personnel data 230 may include security-related information, such as security clearances, user IDs, passwords, security-related biometrics, authorizations, and so forth, corresponding to certain data center personnel. Those of skill in the art will recognize that many such examples of data center personnel data 230 are possible. Accordingly, the foregoing is not intended to limit the spirit, scope, or intent of the invention.

In certain embodiments, various data center assets 244 within a data center monitoring and management environment 200 may have certain interdependencies. As an example, a data center monitoring and management environment 200 may have multiple servers interconnected by a storage area network (SAN) providing block-level access to various disk arrays and tape libraries. In this example, the servers, various physical and operational elements of the SAN, as well the disk arrays and tape libraries, are interdependent upon one another.

In certain embodiments, each data center asset 244 in a data center monitoring and management environment 200 may be treated as a separate data center asset 244 and depreciated individually according to their respective attributes. As an example, a particular rack of servers in a data center monitoring and management environment 200 may be made up of a variety of individual servers, each of which may have a different depreciation schedule. To continue the example, certain of these data center assets 244 may be implemented in different combinations to produce an end result. To further illustrate the example, a particular server in the rack of servers may initially be implemented to query a database of customer records. As another example, the same server may be implemented at later time perform an analysis of sales associated with those same customer records.

In certain embodiments, each data center asset 244 in a data center monitoring and management environment 200 may have an associated maintenance schedule and service contract. For example, a data center monitoring and management environment 200 may include a wide variety of servers and storage arrays, which may respectively be manufactured by a variety of manufacturers. In this example, the frequency and nature of scheduled maintenance, as well as service contract terms and conditions, may be different for each server and storage array. In certain embodiments, the individual data center assets 244 in a data center monitoring and management environment 200 may be configured differently, according to their intended use. To continue the previous example, various servers may be configured with faster or additional processors for one intended workload, while other servers may be configured with additional memory for other intended workloads. Likewise, certain storage arrays may be configured as one RAID configuration, while others may be configured as a different RAID configuration.

In certain embodiments, the data center monitoring and management environment 200 may likewise be implemented to include an asset configuration system 250, a product configuration system 252, a product fabrication system 254, and a supply chain system 256, or a combination thereof. In various embodiments, the asset configuration system 250 may be implemented to perform certain data center asset 244 configuration operations. In certain embodiments, the data center asset 244 configuration operation may be performed to configure a particular data center asset 244 for a particular purpose. In certain embodiments, the data center monitoring and management console 118 may be implemented to interact with the asset configuration system 250 to perform a particular data center asset 244 configuration operation. In various embodiments, the asset configuration system 250 may be implemented to generate, manage, and provide, or some combination thereof, data center asset configuration rules 224. In certain of these embodiments, the data center asset configuration rules 224 may be used to configure a particular data center asset 244 for a particular purpose.

In certain embodiments, a user 202 may use a user device 204 to interact with the data center monitoring and management console 118. As used herein, a user device 204 refers to an information handling system such as a personal computer, a laptop computer, a tablet computer, a personal digital assistant (PDA), a smart phone, a mobile telephone, or other device that is capable of processing and communicating data. In certain embodiments, the communication of the data may take place in real-time or near-real-time. As used herein, real-time broadly refers to processing and providing information within a time interval brief enough to not be discernable by a user 202.

In certain embodiments, a user device 204 may be implemented with a camera 206, such as a video camera known to skilled practitioners of the art. In certain embodiments, the camera 206 may be integrated into the user device 204. In certain embodiments, the camera 206 may be implemented as a separate device configured to interoperate with the user device 204. As an example, a webcam familiar to those of skill in the art may be implemented receive and communicate various image and audio signals to a user device 204 via a Universal Serial Bus (USB) interface. In certain embodiments, the user device 204 may be configured to present a data center monitoring and management console user interface (UI) 240. In certain embodiments, the data center monitoring and management console UI 240 may be implemented to present a graphical representation 242 of data center asset monitoring and management information, which is automatically generated in response to interaction with the data center monitoring and management console 118.

In certain embodiments, a data center monitoring and management application 238 may be implemented on a particular user device 204. In various embodiments, the data center monitoring and management application 238 may be implemented on a mobile user device 204, such as a laptop computer, a tablet computer, a smart phone, a dedicated-purpose mobile device, and so forth. In certain of these embodiments, the mobile user device 204 may be used at various locations within the data center monitoring and management environment 200 by the user 202 when performing a data center monitoring and management operation, described in greater detail herein.

In various embodiments, the data center monitoring and management application 238 may be implemented to facilitate a user 202, such as a data center administrator, operator, or technician, to perform a particular data center remediation operation. In various embodiments, such facilitation may include using the data center monitoring and management application 238 to receive a notification of a data center remediation task, described in greater detail herein, being assigned to the user. In certain embodiments, the data center monitoring and management console 118 may be implemented to generate the notification of the data center remediation task assignment, and assign it to the user, as likewise described in greater detail herein. In certain embodiments, the data center monitoring and management console 118 may be implemented to generate the data center remediation task, and once generated, provide it to the data center monitoring and management application 238 associated with the assigned user 202.

In certain embodiments, such facilitation may include using the data center monitoring and management application 238 to receive the data center remediation task from the data center monitoring and management console 118. In various embodiments, such facilitation may include using the data center monitoring and management application 238 to confirm that the user 202 is at the correct physical location of a particular data center asset 244 associated with a corresponding data center issue. In certain of these embodiments, the data center monitoring and management application 238 may be implemented to include certain Global Positioning System (GPS) capabilities, familiar to those of skill in the art, which may be used to determine the physical location of the user 202 in relation to the physical location of a particular data center asset 244.

In various embodiments, such facilitation may include using the data center monitoring and management application 238 to ensure the user 202 is aware of, or is provided the location of, or receives, or a combination thereof, certain remediation resources, described in greater detail herein, that may be needed to perform a particular data center remediation operation. In various embodiments, such facilitation may include using the data center monitoring and management application 238 to view certain remediation documentation, or augmented instructions, related to performing a particular data center remediation operation. In various embodiments, such facilitation may include using the data center monitoring and management application 238 to certify that a particular data center remediation operation has been performed successfully.

In certain embodiments the UI window 240 may be implemented as a UI window of the data center monitoring and management application 238. In various embodiments, the data center monitoring and management application 238 may be implemented to include, in part or in whole, certain functionalities associated with the data center monitoring and management console 118. In certain embodiments, the data center monitoring and management application 238 may be implemented to interact in combination with the data center monitoring and management console 118, and other components of the data center monitoring and management environment 200, to perform a data center monitoring and management operation.

In certain embodiments, the user device 204 may be used to exchange information between the user 202 and the data center monitoring and management console 118, the data center monitoring and management application 238, the asset configuration system 250, the product configuration system 252, the product fabrication system 254, and the supply chain system 256, or a combination thereof, through the use of a network 140. In various embodiments, the asset configuration system 250 may be implemented to configure a particular data center asset 244 to meet certain performance goals. In various embodiments, the asset configuration system 250 may be implemented to use certain data center monitoring and management data 220, certain data center asset configuration rules 226 it may generate or manage, or a combination thereof, to perform such configurations.

In various embodiments, the product configuration system 252 may be implemented to use certain data center monitoring and management data 220 to optimally configure a particular data center asset 244, such as a server, for an intended workload. In various embodiments, the data center monitoring and management data 220 used by the product configuration system 252 may have been generated as a result of certain data center monitoring and management operations, described in greater detail herein, being performed by the data center monitoring and management console 118. In various embodiments, the product configuration system 252 may be implemented to provide certain product configuration information to a product fabrication system 254. In various embodiments, the product fabrication system 254 may be implemented to provide certain product fabrication information to a product fabrication environment (not shown). In certain embodiments, the product fabrication information may be used by the product fabrication environment to fabricate a product, such as a server, to match a particular data center asset 244 configuration.

In various embodiments, the data center monitoring and management console UI 240 may be presented via a website (not shown). In certain embodiments, the website may be provided by one or more of the data center monitoring and management console 118, the asset configuration system 250, the product configuration system 252, the product fabrication system 254, or the supply chain system 256. In certain embodiments, the supply chain system 256 may be implemented use certain product data 260 to manage the provision, fulfillment, or deployment of a particular data center asset 244 produced in the product fabrication environment. In certain embodiments, the product data 260 may be provided for such use in the form of a JavaScript Object Notation (JSON) document, as described in greater detail herein.

In certain embodiments, the product data 260 may be provided in the form of a JSON document for use by a marketplace catalog system 264. In certain embodiments, the marketplace catalog system 264 may be implemented to use the product information 260 contained in a particular JSON document for presentation on one or more web pages of a website. For the purposes of this disclosure a website may be defined as a collection of related web pages which are identified with a common domain name and is published on at least one web server. A website may be accessible via a public IP network or a private local network.

A web page is a document which is accessible via a browser which displays the web page via a display device of an information handling system. In various embodiments, the web page also includes the file which causes the document to be presented via the browser. In various embodiments, the web page may comprise a static web page, which is delivered exactly as stored and a dynamic web page, which is generated by a web application that is driven by software that enhances the web page via user input 208 to a web server.

In certain embodiments, the data center monitoring and management console 118 may be implemented to interact with the asset configuration system 250, the product configuration system 252, the product fabrication system 254, and the supply chain or fulfillment system 256, or a combination thereof, each of which in turn may be executing on a separate information handling system 100. In certain embodiments, the data center monitoring and management console 118 may be implemented to interact with the asset configuration system 250, the product configuration system 252, the product fabrication system 254, and the supply chain or fulfillment system 256, or a combination thereof, to perform a data center monitoring and management operation, as described in greater detail herein.

Figure 3:
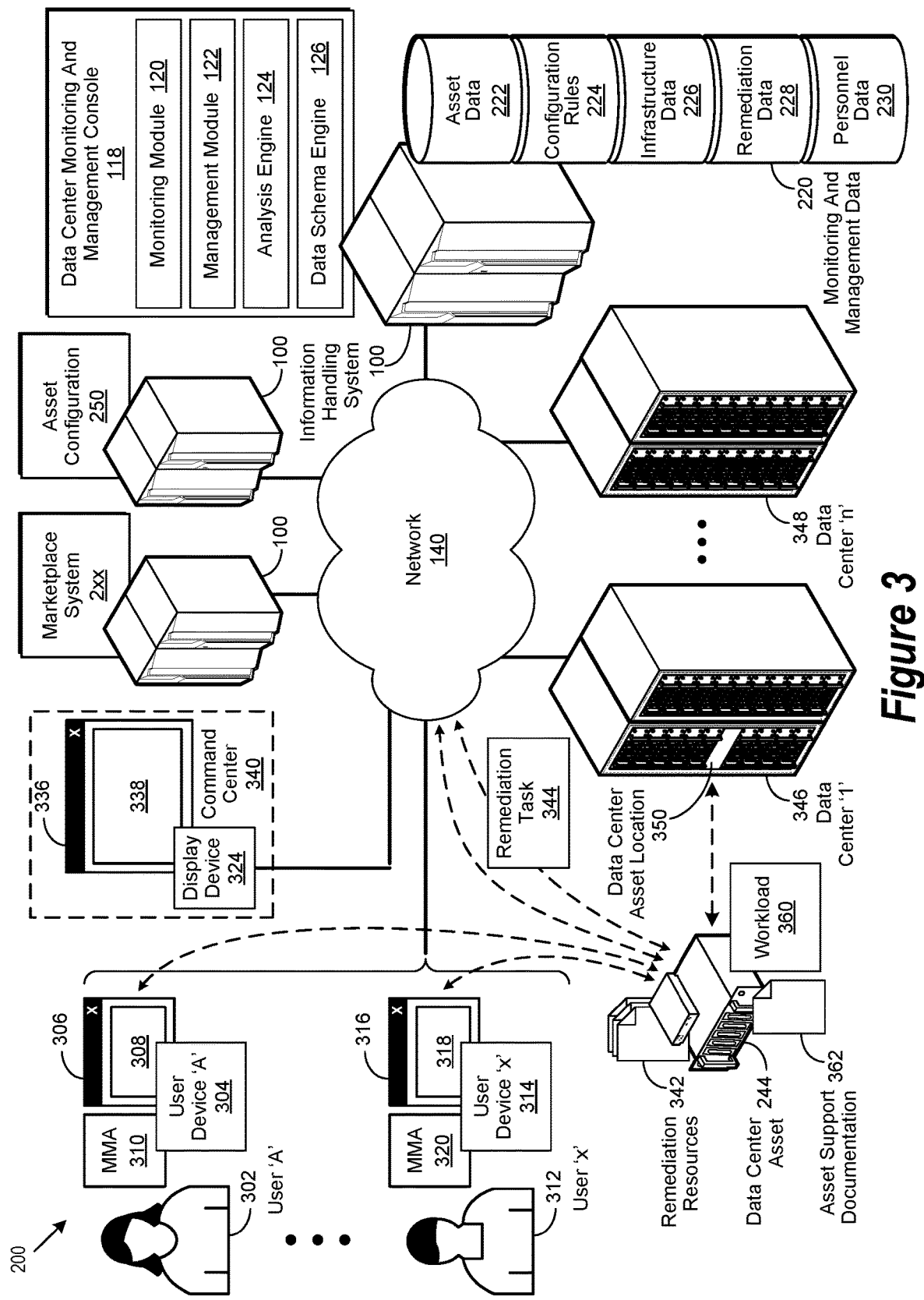
FIG. 3 shows a functional block diagram of the performance of certain data center monitoring and management operations.

FIG. 3 shows a functional block diagram of the performance of certain data center monitoring and management operations implemented in accordance with an embodiment of the invention. In various embodiments, a data center monitoring and management environment 200, described in greater detail herein, may be implemented to include one or more data centers, such as data centers '1' 346 through 'n' 348. As likewise described in greater detail herein, each of the data centers '1' 346 through 'n' 348 may be implemented to include one or more data center assets 244, likewise described in greater detail herein.

In certain embodiments, a data center asset 244 may be implemented to process an associated workload 360. A workload 360, as used herein, broadly refers to a measure of information processing that can be performed by one or more data center assets 244, individually or in combination with one another, within a data center monitoring and management environment 200. In certain embodiments, a workload 360 may be implemented to be processed in a virtual machine (VM) environment, familiar to skilled practitioners of the art. In various embodiments, a workload 360 may be implemented to be processed as a containerized workload 360, likewise familiar to those of skill in the art.

In certain embodiments, as described in greater detail herein, the data center monitoring and management environment 200 may be implemented to include a data center monitoring and management console 118. In certain embodiments, the data center monitoring and management console 118 may be implemented to include a monitoring module 120, a management module 122, an analysis engine 124, and a data schema engine 126, or a combination thereof, as described in greater detail herein.

As described in greater detail herein, the data center monitoring and management console 118 may be implemented in certain embodiments to perform a data center monitoring and management operation. In certain embodiments, the data center monitoring and management console 118 may be implemented to provide a unified framework for the performance of a plurality of data center monitoring and management operations, by a plurality of users, within a common user interface (UI). In certain embodiments, the data center monitoring and management console 118, and other components of the data center monitoring environment 200, such as the asset configuration system 250, may be implemented to be used by a plurality of users, such as users 'A' 302 through 'x' 312 shown in FIG. 3. In various embodiments, certain data center personnel, such as users 'A' 302 through 'x' 312, may respectively interact with the data center monitoring and management console 118, and other components of the data center monitoring and management environment 200, through the use of an associated user device 'A' 304 through 'x' 314.

In certain embodiments, such interactions may be respectively presented to users 'A' 302 through 'x' 312 within a user interface (UI) window 306 through 316, corresponding to user devices 'A' 304 through 'x' 314. In certain embodiments the UI window 306 through 316 may be implemented in a window of a web browser, familiar to skilled practitioners of the art. In certain embodiments, a data center monitoring and management application (MMA) 310 through 320, described in greater detail herein, may be respectively implemented on user devices 'A' 304 through 'x' 314. In certain embodiments the UI window 306 through 316 may be respectively implemented as a UI window of the data center MMA 310 through 320. In certain embodiments, the data center MMA 310 through 320 may be implemented to interact in combination with the data center monitoring and management console 118, and other components of the data center monitoring and management environment 200, to perform a data center monitoring and management operation.

In certain embodiments, the interactions with the data center monitoring and management console 118, and other components of the data center monitoring and management environment 200, may respectively be presented as a graphical representation 308 through 318 within UI windows 306 through 316. In various embodiments, such interactions may be presented to users 'A' 302 through 'x' 312 via a display device 324, such as a projector or large display screen. In certain of these embodiments, the interactions may be presented to users 'A' 302 through 'x' 312 as a graphical representation 338 within a UI window 336.

In certain embodiments, the display device 324 may be implemented in a command center 340, familiar to those of skill in the art, such as a command center 340 typically found in a data center or a network operations center (NOC). In various embodiments, one or more of the users 'A' 302 through 'x' 312 may be located within the command center 340. In certain of these embodiments, the display device 324 may be implemented to be generally viewable by one or more of the users 'A' 302 through 'x' 312.

In certain embodiments, the data center monitoring and management operation may be performed to identify the location 350 of a particular data center asset 244. In certain embodiments, the location 350 of a data center asset 244 may be physical, such as the physical address of its associated data center, a particular room in a building at the physical address, a particular location in an equipment rack in that room, and so forth. In certain embodiments, the location 350 of a data center asset 244 may be non-physical, such as a network address, a domain, a Uniform Resource Locator (URL), a file name in a directory, and so forth.

Certain embodiments of the invention reflect an appreciation that it is not uncommon for large organization to have one or more data centers, such as data centers '1' 346 through 'n' 348. Certain embodiments of the invention reflect an appreciation that it is likewise not uncommon for such data centers to have multiple data center system administrators and data center technicians. Likewise, various embodiments of the invention reflect an appreciation that it is common for a data center system administrator to be responsible for planning, initiating, and overseeing the execution of certain data center monitoring and management operations. Certain embodiments of the invention reflect an appreciation that it is common for a data center system administrator, such as user 'A' 302, to assign a particular data center monitoring and management operation to a data center technician, such as user 'x' 312, as a task to be executed.

Certain embodiments of the invention reflect an appreciation that it is likewise common for a data center administrator, such as user 'A' 302, to assume responsibility for performing a particular data center monitoring and management operation. As an example, a data center administrator may receive a stream of data center alerts, each of which is respectively associated with one or more data center issues. To continue the example, several of the alerts may have an initial priority classification of "critical." However, the administrator may notice that one such alert may be associated with a data center issue that is more critical, or time sensitive, than the others and should be remediated as quickly as possible. Accordingly, the data center administrator may elect to assume responsibility for remediating the data center issue, and as a result, proceed to perform an associated data center remediation operation at that time instead of assigning it to other data center personnel.

Certain embodiments of the invention reflect an appreciation that the number of data center assets 244 in a particular data center '1' 346 through 'n' 348 may be quite large. Furthermore, it is not unusual for such data center assets 244 to be procured, deployed, configured, and implemented on a scheduled, or as needed, basis. It is likewise common for certain existing data center assets 244 to be replaced, upgraded, reconfigured, maintained, or remediated on a scheduled, or as-needed, basis. Likewise, certain embodiments of the invention reflect an appreciation that such replacements, upgrades, reconfigurations, maintenance, or remediation may be oriented towards hardware, firmware, software, connectivity, or a combination thereof.

For example, a data center system administrator may be responsible for the creation of data center asset 244 procurement, deployment, configuration, and implementation templates, firmware update bundles, operating system (OS) and software application stacks, and so forth. Likewise, a data center technician may be responsible for receiving a procured data center asset 244, transporting it to a particular data asset location 350 in a particular data center '1' 346 through 'n' 348, and implementing it in that location 350. The same, or another, data center technician may then be responsible for configuring the data center asset 244, establishing network connectivity, applying configuration files, and so forth. To continue the example, the same, or another, data center administrator or technician may be responsible for remediating hardware issues, such as replacing a disc drive in a server or Redundant Array of Independent Disks (RAID) array, or software issues, such as updating a hardware driver or the version of a server's operating system. Accordingly, certain embodiments of the invention reflect an appreciation that a significant amount of coordination may be needed between data center system administrators and data center technicians to assure efficient and reliable operation of a data center.

In various embodiments, certain data center monitoring and management operations may include a data center remediation operation, described in greater detail herein. In certain embodiments, a data center remediation operation may be performed to remediate a particular data asset 244 issue at a particular data asset location 350 in a particular data center '1' 346 through 'n' 348. In certain embodiments, the data center remediation operation may be performed to ensure that a particular data center asset location 350 in a particular data center '1' 346 through 'n' 348 is available for the replacement or upgrade of an existing data center asset 244. As an example, a data center remediation operation may involve deployment of a replacement server that occupies more rack space than the server it will be replacing.

In various embodiments, certain data center monitoring and management operations may include a data schema mapping operation. In various embodiments, one or more data schema mapping operations may be performed to generate certain data center asset support documentation 362, as described in greater detail herein, for a particular data center asset 244. In various embodiments, one or more data schema mapping operations may be performed to receive data center asset support documentation 362 in the form of a JavaScript Object Notation (JSON) document and derive its schema.

In certain of these embodiments, one or more data schema mapping operations may be performed to map components of the JSON document's schema to corresponding components of a schema associated with the data center asset support documentation 362. Likewise, in certain embodiments, one or more data schema mapping operation may be performed to migrate the mapped objects contained in the JSON document to the schema of a relational database implemented to manage the data center asset support documentation 362. In certain embodiments, the data center asset documentation 362 may be used in the performance of a data center asset remediation operation, likewise as described in greater detail herein.

In various embodiments, the data center monitoring and management console 118, or the data center monitoring and management application 310 through 320, or a combination of the two, may be implemented in a failure tracking mode to capture certain data center asset 244 telemetry. In various embodiments, the data center asset 244 telemetry may include data associated with the occurrence of certain events, such as the failure, or anomalous performance, of a particular data center asset 244, or an associated workload 360, in whole, or in part. In certain embodiments, the data center asset 244 telemetry may be captured incrementally to provide a historical perspective of the occurrence, and evolution, of an associated data center issue.

In various embodiments, the data center monitoring and management console 118 may likewise be implemented generate certain remediation operation notes. For example, the data center monitoring and management console 118 may enter certain data center asset 244 remediation instructions in the data center remediation operation notes. In various embodiments, the data center remediation operation notes may be implemented to contain information related to data center asset 244 replacement or upgrade parts, data center asset 244 files that may be needed, installation and configuration instructions related to such files, the physical location 350 of the data center asset 244, and so forth.

In various embodiments, such information may be stored in the form of a JSON document, or a relational database, or a combination of the two. In certain of these embodiments, the JSON document and the relational database may respectively have associated data schemas. In certain embodiments, a data schema mapping operation may be performed to map the schema of a particular JSON document to the schema of a particular relational database. In various embodiments, the resulting mapping may be used to migrate certain data from the JSON document to the relational database.

In certain embodiments, a remediation task 344 may be generated by associating the previously-generated data center remediation operation notes with the remediation documentation, data center asset files, or other remediation resources 342 most pertinent to the data center issue, and the administrator, and any data center personnel selected or its remediation. As used herein, a data center remediation task 344 broadly refers to one or more data center remediation operations, described in greater detail herein, that can be assigned to one or more users 'A' 302 through 'x' 312. In certain embodiments, operational information associated with a particular remediation task 344 may be stored in the form of a JSON document, or a relational database, or a combination of the two. In certain embodiments, certain operational information may be used by the data center monitoring and management console 118 in the performance of a data center monitoring and management operation, described in greater detail herein.

Certain embodiments of the invention reflect an appreciation that a group of data center personnel, such as users 'A' 302 through 'x' 312, will likely possess different skills, certifications, levels of education, knowledge, experience, and so forth. As a result, remediation documentation that is suitable for certain data center personnel may not be suitable for others. For example, a relatively inexperienced data center administrator may be overwhelmed by a massive volume of detailed and somewhat arcane minutiae related to the configuration and administration of multiple virtual machines (VMs) on a large server. However, such remediation documentation may be exactly what a highly skilled and experienced data center administrator needs to remediate subtle server and VM configuration issues.

Conversely, the same highly skilled and experienced data center administrator may be hampered, or slowed down, by being provided remediation documentation that is too simplistic, generalized, or high-level for the data center issue they may be attempting to remediate. Likewise, an administrator who is moderately skilled in configuring VMs may benefit from having step-by-step instructions, and corresponding checklists, when remediating a VM-related data center issue. Accordingly, as used herein, pertinent remediation documentation broadly refers to remediation documentation applicable to a corresponding data center issue that is most suited to the skills, certifications, level of education, knowledge, experience, and so forth of the data center personnel assigned to its remediation.

In various embodiments, the data center monitoring and management console 118 may be implemented to generate a corresponding notification of the remediation task 344. In certain embodiments, the resulting notification of the remediation task 344 assignment may be provided to the one or more users 'A' 302 through 'x' 312 assigned to perform the remediation task 344. In certain embodiments, the notification of the remediation task 344 assignment may be respectively provided to the one or more users 'A' 302 through 'x' 312 within the UI 306 through 316 of their respective user devices 'A' 304 through 'x' 314. In certain embodiments, the notification of the remediation task 344 assignment, and the remediation task 344 itself, may be implemented such that they are only visible to the users 'A' 302 through 'x' 312 to which it is assigned.

In certain embodiments, the data center monitoring and management console 118 may be implemented to operate in a monitoring mode. As used herein, monitoring mode broadly refers to a mode of operation where certain monitoring information provided by the monitoring and management console 118 is available for use by one or more users 'A' 302 through 'x' 312. In certain embodiments, one or more of the users 'A' 302 through 'x' 312 may be command center 340 users. In certain embodiments, the data center monitoring and management console 118 may be implemented to operate in a management mode. As used herein, management mode broadly refers to a mode of operation where certain operational functionality of the data center monitoring and management console 118 is available for use by a user, such as users 'A' 302 through 'x' 312.

Figure 4A:
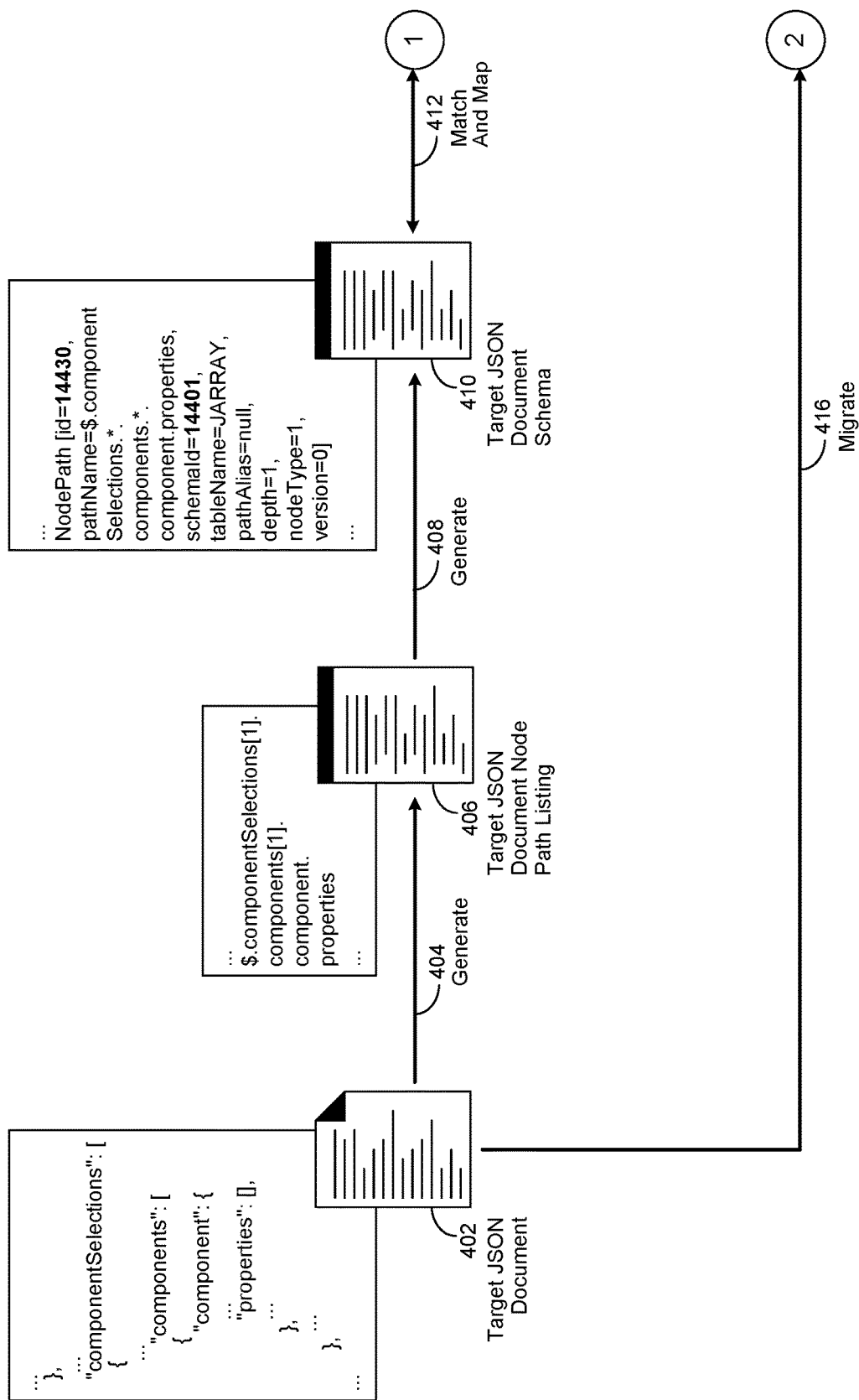
FIGS. 4a and 4b show a simplified process flow of the performance of certain data schema mapping operations.
Figure 4B:
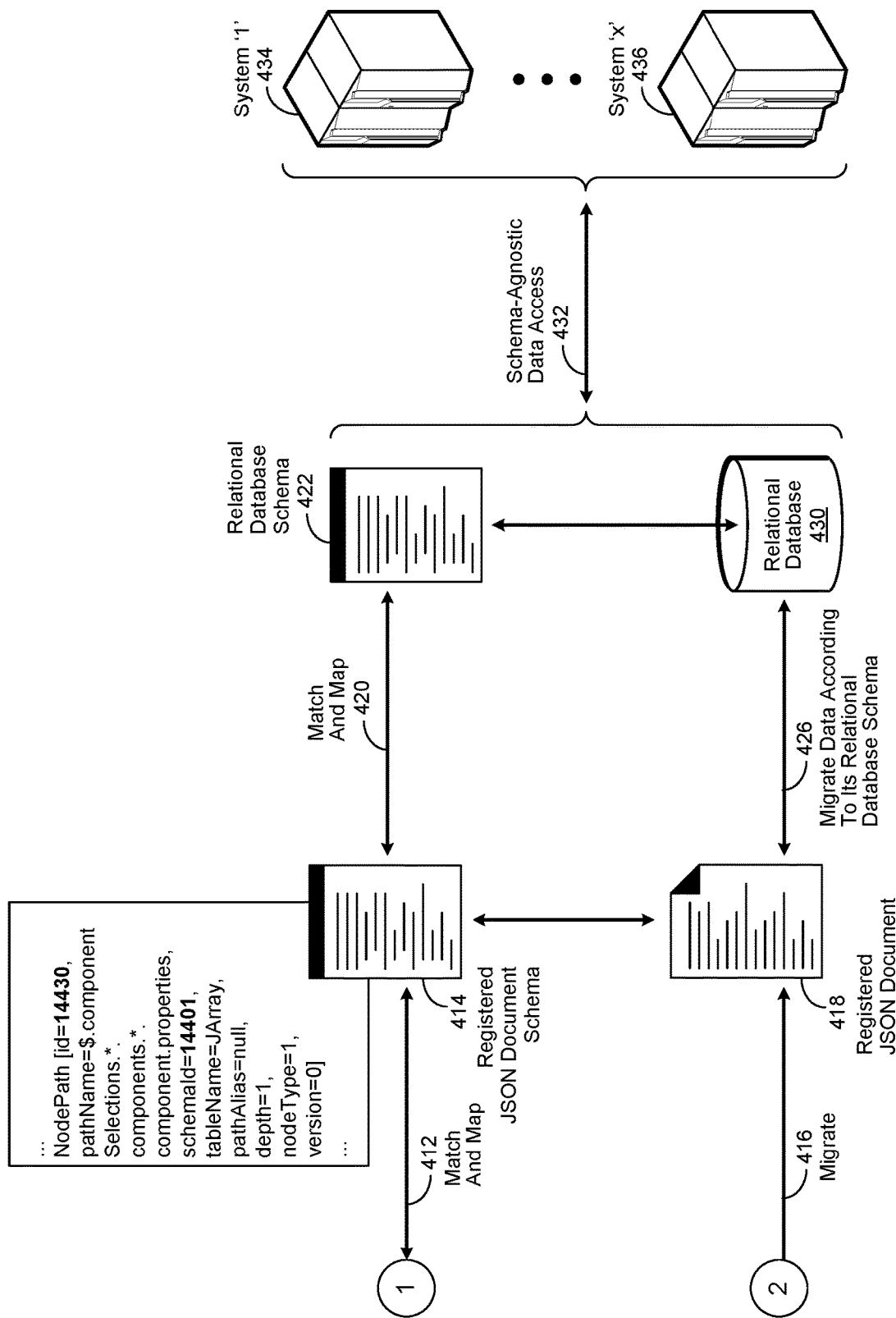

FIGS. 4a and 4b show a simplified process flow of the performance of certain data schema mapping operations implemented in accordance with an embodiment of the invention. In certain embodiments, data schema mapping operations may be initiated within a data center monitoring and management environment, described in greater detail herein, by performing ongoing monitoring operations to detect the receipt of data in the form of a target JavaScript Object Notation (JSON) document 402. Those of skill in the art will be aware that JSON is a flexible, declarative format commonly used to pass data between applications via key/value pairs, as exemplified in the following expanded example of the target JSON document 402 shown in FIG. 4a:

```
{
  "id": "115-bbbr",
  "name": "APEXDSS FILE TBHR SUB",
  "description": "APEXDSS FILE TBHR SUB",
  "aliases": {
    "aliasIds": [
      {
        "id": "115-bbbr",
        "type": "sku"
      }
    ]
  },
  "commodityClass": {
    "unspsc": [ ]
  },
  "components": [ ],
  "componentSelections": [
    {
      "id": "PerformanceTier",
      "name": "Performance Tier",
      "multiSelect": false,
      "tied": false,
      "components": [
        {
          "component": {
            "id": "Tier1",
            "name": "Tier 1",
            "description": "Tier 1",
            "aliases": {
              "aliasIds": [ ]
            },
...
```

-continued

```
            "commodityClass": {
              "unspsc": [ ]
            },
            "components": [ ],
            "componentSelections": [ ],
            "fulfillment": { },
            "itemType": { },
            "manufacturer": { },
            "specifications": [ ],
            "properties": [ ],
            "unitOfMeasure": "N/A",
            "sellable": false,
            "links": { }
          },
          "componentGroups": [ ],
          "excluded": false,
          "singleConfiguration": false,
          "selected": false,
          "required": false,
          "path": "$.componentSelections[?(@.id == 'PerformanceTier')].components[?(@.component.id == 'Tier1')]",
          "sequence": 1
        }
      ]
    }
  ],
  ...
  "properties": [
    {
      "key": "itemclassification",
      "status": "Active",
      "description": "itemClassification",
      "value": "Offer",
      "name": "itemClassification"
    }
  ],
  "classifications": [
    "pacitem"
  ],
  "productTaxonomy": {
    "productLineId": "offer"
  },
  "status": "Active",
  "links": { },
  "authoringSource": "PAC",
  "sourceEntityType": "CloudOffer",
  "created": "2021-09-21T15:06:18.6484217+00:00",
  "lastUpdated": "2021-09-21T16:00:26.4329635+00:00"
}
```

In various embodiments, one or more data schema mapping operations may be performed on a target JSON document 402 to identify its associated node paths and node types. In certain of these embodiments, the identified node paths and node types may then be used in the performance of one or more data schema mapping operations to generate an associated target JSON document node path listing 406, as exemplified in the following expanded example of the target JSON document node path listing 406 shown in FIG. 4a:

```
$
$.id
$.name
$.description
$.aliases
$.aliases.aliasIds
$.aliases.aliasIds[0]
$.aliases.aliasIds[0].id
$.aliases.aliasIds[0].type
$.commodityClass
$.commodityClass.unspsc
$.components
$.componentSelections
$.componentSelections[0]
$.componentSelections[0].id
```

```
$.componentSelections[0].name
$.componentSelections[0].multiSelect
$.componentSelections[0].tied
$.componentSelections[0].components
$.componentSelections[0].components[0]
$.componentSelections[0].components[0].component
$.componentSelections[0].components[0].component.id
$.componentSelections[0].components[0].component.name
$.componentSelections[0].components[0].component.description
$.componentSelections[0].components[0].component.aliases
$.componentSelections[0].components[0].component.aliases.aliasIds
$.componentSelections[0].components[0].component.commodityClass
$.componentSelections[0].components[0].component.commodityClass.unspsc
$.componentSelections[0].components[0].component.components
$.componentSelections[0].components[0].component.componentSelections
$.componentSelections[0].components[0].component.fulfillment
$.componentSelections[0].components[0].component.itemType
$.componentSelections[0].components[0].component.manufacturer
$.componentSelections[0].components[0].component.specifications
$.componentSelections[0].components[0].component.properties
$.componentSelections[0].components[0].component.unitOfMeasure
$.componentSelections[0].components[0].component.sellable
$.componentSelections[0].components[0].component.links
$.componentSelections[0].components[0].componentGroups
$.componentSelections[0].components[0].excluded
$.componentSelections[0].components[0].singleConfiguration
$.componentSelections[0].components[0].selected
$.componentSelections[0].components[0].required
$.componentSelections[0].components[0].path
$.componentSelections[0].components[0].sequence
. . .
$.properties
$.properties[0]
$.properties[0].key
$.properties[0].status
$.properties[0].description
$.properties[0].value
$.properties[0].name
$.classifications
$.classifications[0]
$.productTaxonomy
$.productTaxonomy.productLineId
$.status
$.links
$.authoringSource
$.sourceEntityType
$.created
$.lastUpdated
```

In various embodiments, a target JSON document node path listing may be used in one or more data schema mapping operations to generate 408 an associated target JSON document schema 410, as exemplified in the following expanded example of the target JSON document schema 410 shown in FIG. 4a:

NodePath [id=14402, pathName=$, schemaId=14401, tableName=JOBJECT, pathAlias=null, depth=0, nodeType=0, version=0]

NodePath [id=14403, pathName=$.components, schemaId=14401, tableName=JARRAY, pathAlias=null, depth=1, nodeType=1, version=0]

NodePath [id=14449, pathName=$.properties, schemaId=14401, tableName=JARRAY, pathAlias=null, depth=1, nodeType=1, version=0]

NodePath [id=14446, pathName=$.commodityClass, schemaId=14401, tableName=JOBJECT, pathAlias=null, depth=1, nodeType=0, version=0]

NodePath [id=14405, pathName=$.itemType, schemaId=14401, tableName=JOBJECT, pathAlias=null, depth=1, nodeType=0, version=0]

NodePath [id=14436, pathName=$.specifications, schemaId=14401, tableName=JARRAY, pathAlias=null, depth=1, nodeType=1, version=0]

NodePath [id=14445, pathName=$.fulfillment, schemaId=14401, tableName=JOBJECT, pathAlias=null, depth=1, nodeType=0, version=0]

NodePath [id=14441, pathName=$.classifications, schemaId=14401, tableName=JARRAY, pathAlias=null, depth=1, nodeType=1, version=0]

NodePath [id=14406, pathName=$.aliases, schemaId=14401, tableName=JOBJECT, pathAlias=null, depth=1, nodeType=0, version=0]

NodePath [id=14443, pathName=$.productTaxonomy, schemaId=14401, tableName=JOBJECT, pathAlias=null, depth=1, nodeType=0, version=0]

NodePath [id=14444, pathName=$.links, schemaId=14401, tableName=JOBJECT, pathAlias=null, depth=1, nodeType=0, version=0]

NodePath [id=14409, pathName=$.componentSelections, schemaId=14401, tableName=JARRAY, pathAlias=null, depth=1, nodeType=1, version=0]

NodePath [id=14440, pathName=$.manufacturer, schemaId=14401, tableName=JOBJECT, pathAlias=null, depth=1, nodeType=0, version=0]

NodePath [id=14407, pathName=$.aliases.aliasIds, schemaId=14401, tableName=JARRAY, pathAlias=null, depth=2, nodeType=1, version=0]

NodePath [id=14437, pathName=$.specifications.*, schemaId=14401, tableName=JARRAY, pathAlias=null, depth=2, nodeType=1, version=0]
NodePath [id=14410, pathName=$.componentSelections.*, schemaId=14401, tableName=JARRAY, pathAlias=null, depth=2, nodeType=1, version=0]
NodePath [id=14404, pathName=$.components.*, schemaId=14401, tableName=JARRAY, pathAlias=null, depth=2, nodeType=1, version=0]
NodePath [id=14442, pathName=$.classifications.*, schemaId=14401, tableName=JARRAY, pathAlias=null, depth=2, nodeType=1, version=0]
NodePath [id=14447, pathName=$.commodityClass.unspsc, schemaId=14401, tableName=JARRAY, pathAlias=null, depth=2, nodeType=1, version=0]
NodePath [id=14450, pathName=$.properties.*, schemaId=14401, tableName=JARRAY, pathAlias=null, depth=2, nodeType=1, version=0]
NodePath [id=14438, pathName=$.specifications.*.values, schemaId=14401, tableName=JARRAY, pathAlias=null, depth=3, nodeType=1, version=0]
NodePath [id=14434, pathName=$.componentSelections.*.selectionGroups, schemaId=14401, tableName=JARRAY, pathAlias=null, depth=3, nodeType=1, version=0]
NodePath [id=14408, pathName=$.aliases.aliasIds.*, schemaId=14401, tableName=JARRAY, pathAlias=null, depth=3, nodeType=1, version=0]
NodePath [id=14411, pathName=$.componentSelections.*.components, schemaId=14401, tableName=JARRAY, pathAlias=null, depth=3, nodeType=1, version=0]
NodePath [id=14448, pathName=$.commodityClass.unspsc.*, schemaId=14401, tableName=JARRAY, pathAlias=null, depth=3, nodeType=1, version=0]
NodePath [id=14439, pathName=$.specifications.*.values.*, schemaId=14401, tableName=JARRAY, pathAlias=null, depth=4, nodeType=1, version=0]
NodePath [id=14435, pathName=$.componentSelections.*.selectionGroups.*, schemaId=14401, tableName=JARRAY, pathAlias=null, depth=4, nodeType=1, version=0]
NodePath [id=14412, pathName=$.componentSelections.*.components.*, schemaId=14401, tableName=JARRAY, pathAlias=null, depth=4, nodeType=1, version=0]
NodePath [id=14432, pathName=$.componentSelections.*.components.*.componentGroups, schemaId=14401, tableName=JARRAY, pathAlias=null, depth=5, nodeType=1, version=0]
NodePath [id=14413, pathName=$.componentSelections.*.components.*.component, schemaId=14401, tableName=JOBJECT, pathAlias=null, depth=5, nodeType=0, version=0]
NodePath [id=14426, pathName=$.componentSelections.*.components.*.component.fulfillment, schemaId=14401, tableName=JOBJECT, pathAlias=null, depth=6, nodeType=0, version=0]
NodePath [id=14427, pathName=$.componentSelections.*.components.*.component.commodityClass, schemaId=14401, tableName=JOBJECT, pathAlias=null, depth=6, nodeType=0, version=0]
NodePath [id=14420, pathName=$.componentSelections.*.components.*.component.componentSelections, schemaId=14401, tableName=JARRAY, pathAlias=null, depth=6, nodeType=1, version=0]
NodePath [id=14422, pathName=$.componentSelections.*.components.*.component.specifications, schemaId=14401, tableName=JARRAY, pathAlias=null, depth=6, nodeType=1, version=0]
NodePath [id=14433, pathName=$.componentSelections.*.components.*.componentGroups.*, schemaId=14401, tableName=JARRAY, pathAlias=null, depth=6, nodeType=1, version=0]
NodePath [id=14425, pathName=$.componentSelections.*.components.*.component.links, schemaId=14401, tableName=JOBJECT, pathAlias=null, depth=6, nodeType=0, version=0]
NodePath [id=14417, pathName=$.componentSelections.*.components.*.component.aliases, schemaId=14401, tableName=JOBJECT, pathAlias=null, depth=6, nodeType=0, version=0]
NodePath [id=14424, pathName=$.componentSelections.*.components.*.component.manufacturer, schemaId=14401, tableName=JOBJECT, pathAlias=null, depth=6, nodeType=0, version=0]
NodePath [id=14414, pathName=$.componentSelections.*.components.*.component.components, schemaId=14401, tableName=JARRAY, pathAlias=null, depth=6, nodeType=1, version=0]
NodePath [id=14416, pathName=$.componentSelections.*.components.*.component.itemType, schemaId=14401, tableName=JOBJECT, pathAlias=null, depth=6, nodeType=0, version=0]
NodePath [id=14430, pathName=$.componentSelections.*.components.*.component.properties, schemaId=14401, tableName=JARRAY, pathAlias=null, depth=6, nodeType=1, version=0]
NodePath [id=14421, pathName=$.componentSelections.*.components.*.component.componentSelections.*, schemaId=14401, tableName=JARRAY, pathAlias=null, depth=7, nodeType=1, version=0]
NodePath [id=14428, pathName=$.componentSelections.*.components.*.component.commodityClass.unspsc, schemaId=14401, tableName=JARRAY, pathAlias=null, depth=7, nodeType=1, version=0]
NodePath [id=14418, pathName=$.componentSelections.*.components.*.component.aliases.aliasIds, schemaId=14401, tableName=JARRAY, pathAlias=null, depth=7, nodeType=1, version=0]
NodePath [id=14415, pathName=$.componentSelections.*.components.*.component.components.*, schemaId=14401, tableName=JARRAY, pathAlias=null, depth=7, nodeType=1, version=0]
NodePath [id=14423, pathName=$.componentSelections.*.components.*.component.specifications.*, schemaId=14401, tableName=JARRAY, pathAlias=null, depth=7, nodeType=1, version=0]
NodePath [id=14431, pathName=$.componentSelections.*.components.*.component.properties.*, schemaId=14401, tableName=JARRAY, pathAlias=null, depth=7, nodeType=1, version=0]
NodePath [id=14419, pathName=$.componentSelections.*.components.*.component.aliases.aliasIds.*, schemaId=14401, tableName=JARRAY, pathAlias=null, depth=8, nodeType=1, version=0]
NodePath [id=14429, pathName=$.componentSelections.*.components.*.component.commodityClass.unspsc.*, schemaId=14401, tableName=JARRAY, pathAlias=null, depth=8, nodeType=1, version=0]
. . . .

Various embodiments of the invention reflect an appreciation that while a particular target JSON document 402 may be parsed to identify all of its node paths and node types, certain nodes, or certain properties of a node, may be optional in its original JSON document schema. Accordingly, an associated target JSON document node path listing 406 may not be exact, and as a result, neither will its associated target JSON document schema 410. Furthermore, some optional JSON nodes, or node properties, or both, may be missing. In various embodiments, certain data schema operations may be performed to identify JSON node paths and properties in the target JSON document schema 410 for an associated target JSON document 402 and assign it a version number.

In certain embodiments, missing JSON nodes and properties may be tolerated when matching and mapping 412 components of the target JSON document schema 410 generated 408 from an associated target JSON document node path listing 406 to a particular registered JSON document schema 414. As used herein, a registered JSON document schema 414 broadly refers to an existing, revised, or new JSON document schema based upon a particular target JSON document schema 410. Likewise, certain embodiments of the invention reflect an appreciation that additional JSON nodes and properties detected in a particular target JSON document 402 may be due to the inclusion of optional, or new, nodes and properties. Accordingly, in various embodiments, one or more data schema mapping operations may be performed to receive a target JSON document 402 and generate 404 a list 406 of all of its node paths, which in turn may be used to generate 408 an associated target JSON document schema 410. In certain of these embodiments, one or more data schema mapping operations may be implemented to use these node paths to track the resulting target JSON document schema 410.

In certain embodiments, the target JSON document schema 410 generated from a particular target JSON document 402 may use an array index, such as [0], [1], etc., to track its various node paths. In various embodiments, such node paths may be used by one or more data schema mapping operations to track the target JSON document schema 410 such that the array index will impose certain restrictions on array elements. In certain embodiments, one or more data schema mapping operations may be implemented to use an '*' character to represent an array node in the path.

In certain embodiments, as shown above, "NodePath" may be implemented in the performance of one or more data schema mapping operations to track node paths such as "$.componentSelections.*.components.*.component. properties.*" (where nodeType [0] is a JSONobject and nodeType [1] is JSONarray) and its depth (e.g., root $ depth='0', path depth='7', and so on). In certain embodiments, one or more data schema mapping operations may be performed to assign each resulting target JSON data schema 410 a schema name and version number, which are version controlled.

In certain embodiments, a determination may be made whether to migrate 416 data contained in a particular target JSON document 402 to a particular registered JSON document 416, which is associated with a corresponding registered JSON document schema 414. If so, then the target JSON data schema 410 is mapped 412 to a registered JSON document schema 414 that it matches. In certain embodiments, the resulting data schema mapping 412 may then be used to migrate 416 data contained in the target JSON document 402 associated with the previously selected target JSON document schema 410 to the registered JSON document 418.

In various embodiments, certain data schema mapping operations may be performed to revise a particular registered JSON data schema 414 to accommodate deviations in a target JSON data schema 410. For example, a particular target JSON data schema 410 may contain a {"productID": "string"} component whose "maxlength" is defined as '20', while a closely-matching registered JSON data schema 414 may contain a {"productID": "string"} component whose "maxlength" is defined as '18'. In this example, the closely-matching registered JSON data schema 414 may be revised such that the "maxlength" of its {"productID": "string"} component is redefined as '20'. In certain embodiments, the revised registered JSON data schema 414 may first be versioned, followed by the document schema 410 of the target JSON document 402 being mapped 412 to it. In certain embodiments, the resulting document schema mapping 412 may then be used to migrate 416 data contained in the target JSON document 402 associated with the previously selected target JSON data schema 410 to the revised registered JSON document 418.

In various embodiments, certain data scheming mapping operations may be performed to generate a new registered JSON document schema 414 from a target JSON document schema 410. For example, a particular target JSON document schema 410 may not match any existing registered JSON document schemas 414. Accordingly, in this example, the new registered JSON document schema 414 may be based upon the target JSON document schema 410. In certain embodiments, the new registered JSON document schema 414 may first be versioned, followed by the document schema 410 of the target JSON document 402 being mapped 412 to it. In certain embodiments, the resulting document schema 412 mapping may then be used to migrate 416 data contained in the target JSON document 402 associated with the previously-selected target JSON document schema 410 the new registered JSON document 418.

In various embodiments, certain data scheming mapping operations may be performed to migrate 426 data from a registered JSON document 418 to a target relational database 430. In certain of these embodiments, a particular registered JSON document schema 414 may first be selected, and then mapped 420 to a matching target relational database schema 422 associated with the target relational database 430. In certain embodiments, the resulting data schema mapping 420 may then be used to migrate 426 data contained in the registered JSON document 402 associated with the previously-selected registered JSON document schema 418 to the target relational database 430.

In various embodiments, the mapping 420 of a particular registered JSON document schema 414 to a target relational database schema 422 may be accomplished by adding additional tables to its associated relational database 430. In certain embodiments, the additional tables may include a TargetJSONDocumentName table, to track individual target JSON documents 402, a JArray table, to track JSON arrays, and a JObject table, for tracking JSON objects (also referred to as JSON data elements). In various embodiments, the additional tables may include a SchemaName table. In certain embodiments, the SchemaName table may be implemented for registering a particular target JSON document schema 410 as a registered JSON document schema 414. In certain embodiments, the SchemaName table may be implemented to track a particular target JSON document schema 410 and detect when it deviates from an associated registered JSON document schema 414.

In various embodiments, the additional tables may include a NodePath table. In certain embodiments, the NodePath table may be implemented for mapping the JSON node path of a particular JSON object to a JObject table and a particular JSON array to a JArray table. In certain embodiments, an alias name may be assigned to a particular NodePath table entry. In these embodiments, the method by which the alias name is selected, and the method by which it is associated with the NodePath table is a matter of design choice.

In various embodiments, the mapping 420 of a registered JSON document schema to a target relational database schema 422 may be initiated by first mapping implicit top-level JSON objects, lower level JSON objects and JSON arrays to the previously-described additional relational database tables. In certain embodiments one JSON object is mapped per row in the JObject table. In certain embodiments, the data content corresponding to a JSON array is mapped to a text column of the JArray table, with one JSON array mapped per row. In certain embodiments, for a particular JSON object a child JSON object or JSON array may be replaced with a link reference pointing to a corresponding row in the JObject and JArray tables.

In certain embodiments, for a particular JSON array, each JSON object in the JSON array may be replaced with a link reference pointing to a corresponding row in the JObject table. In various embodiments, the preceding operations may be iteratively performed until only JSON objects and JSON arrays exist in the leaf JSON nodes. In certain of these embodiments, all JSON objects and JSON arrays higher in the JSON node hierarchy are replaced by link references.

In various embodiments, the preceding operations may be performed determine whether a particular target JSON document schema 410 deviates from a particular registered JSON document schema 414. For example, a JSON object within the target JSON document schema 410 may not have all of the properties defined in a corresponding registered JSON document schema 414. As another example, a target JSON document schema 410 may contain JSON objects and JSON arrays that were not previously defined in a corresponding registered JSON document schema 414. As yet another example, a target JSON document schema 410 may contain JSON objects whose types or properties may have changed, and as a result, no longer comply with a corresponding registered document schema 414.

Accordingly, users may be allowed in various embodiments to make changes to a particular registered JSON document schema 414 to accommodate such deviations in a corresponding target JSON document schema 410. In certain of these embodiments, such changes to a registered JSON document schema 414 may be assigned a new version. In these embodiments, the method by which a particular registered JSON document schema 414 may be versioned is a matter of design choice.

In certain embodiments, the target relational database 430, and its associated target relational database schema 422, may then be accessed 462 by systems '1' 434 through 'x' 436. In certain embodiments, the systems '1' 434 through 'x' 436 may include a data center monitoring and management console, a product fabrication system, a product configuration system, a supply chain system, an asset configuration system, and so forth, as described in greater detail herein. Those of skill in the art will recognize many such embodiments of a data schema mapping operation are possible. Accordingly, the foregoing is not intended to limit the spirit, scope, or intent of the invention.

Figure 5A:
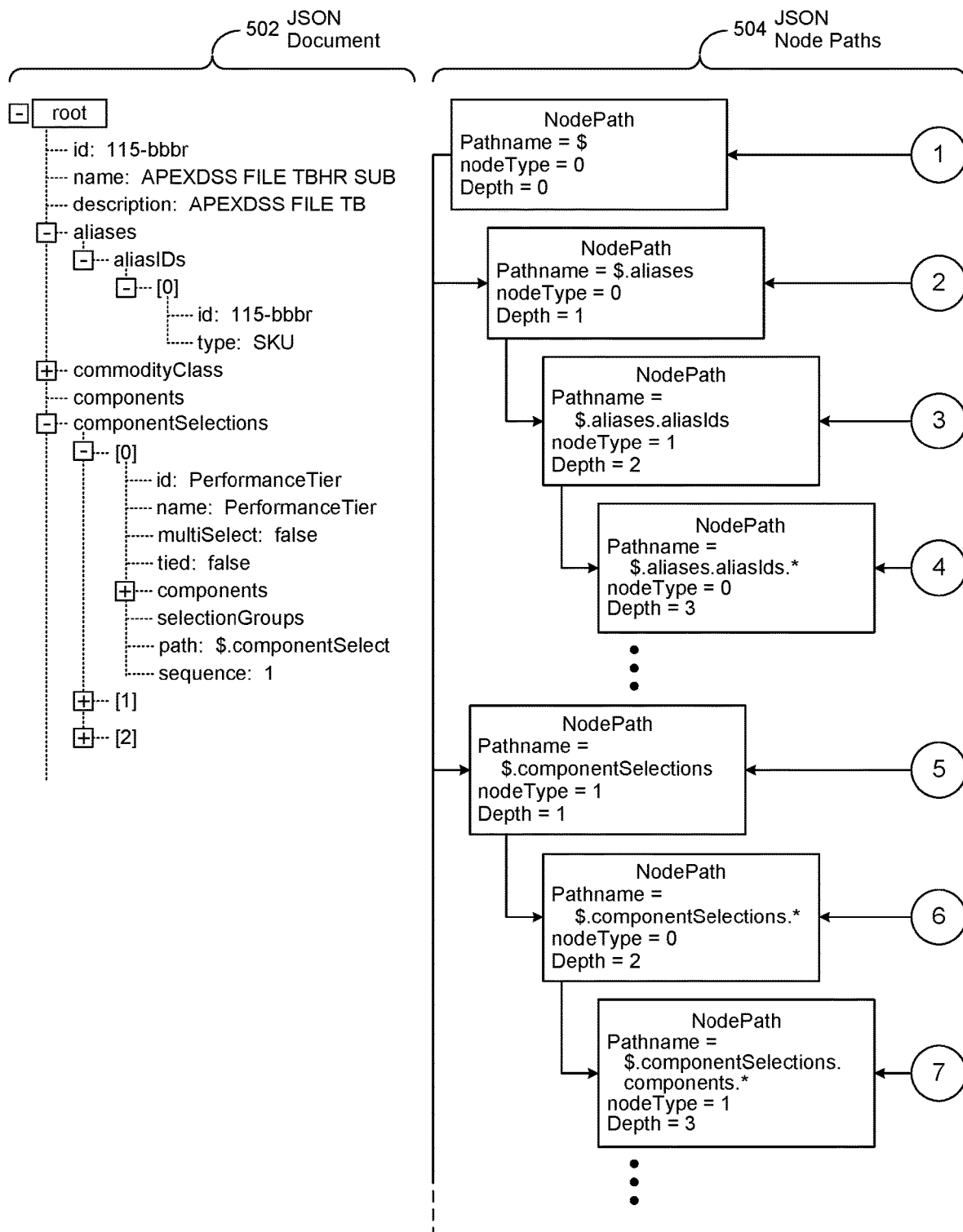
FIGS. 5a and 5b show a portion of an example JavaScript Object Notation (JSON) document used to generate an associated JSON document schema.
Figure 5B:
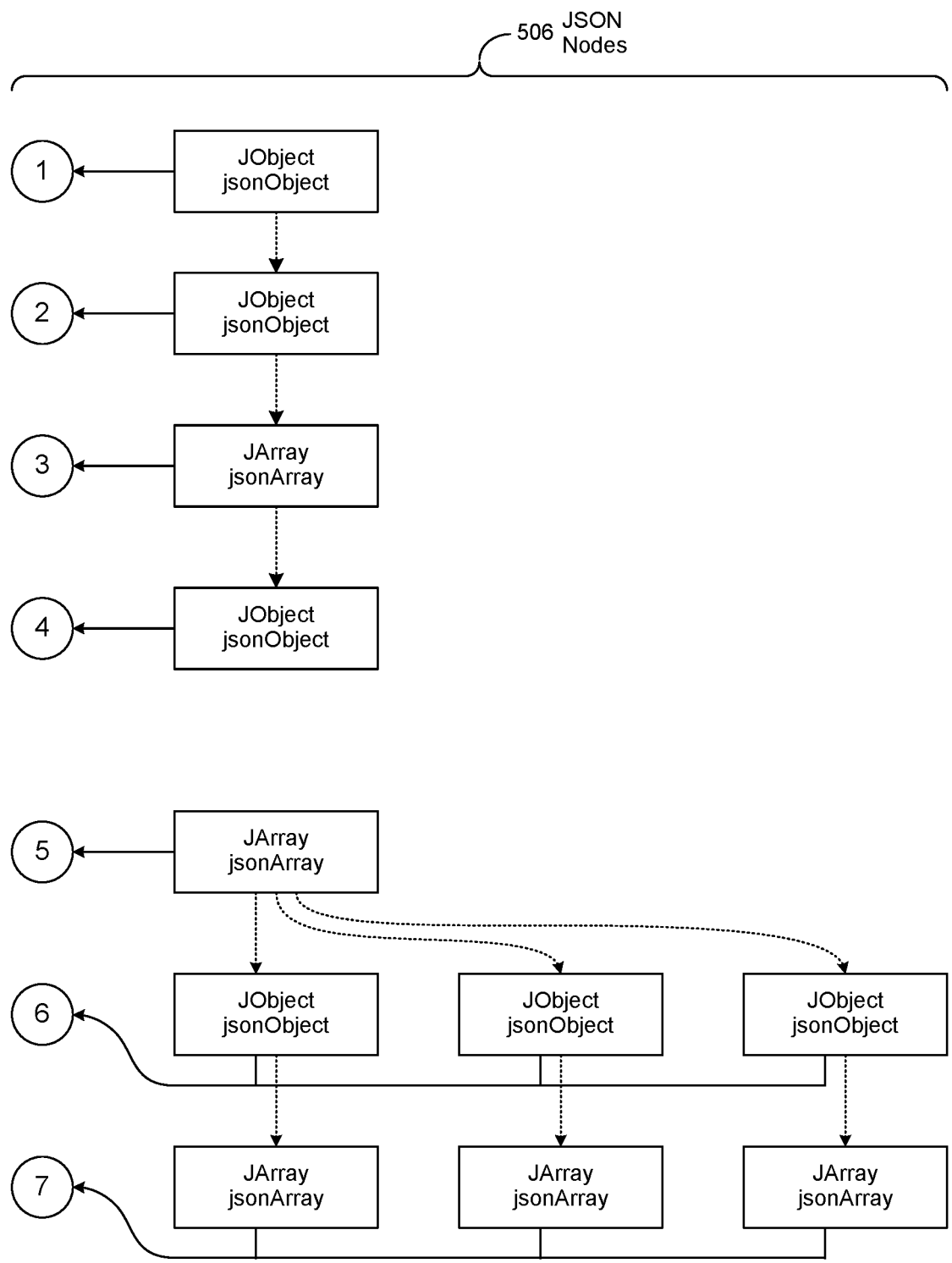

FIGS. 5a and 5b show a portion of an example JavaScript Object Notation (JSON) document used in accordance with an embodiment of the invention to generate an associated JSON document schema. In various embodiments, as shown in FIGS. 5a and 5b, a target JSON document 502 is processed to identify its associated JSON node paths 504, their associated JSON nodes 506, and their interrelationship.

Figure 6:
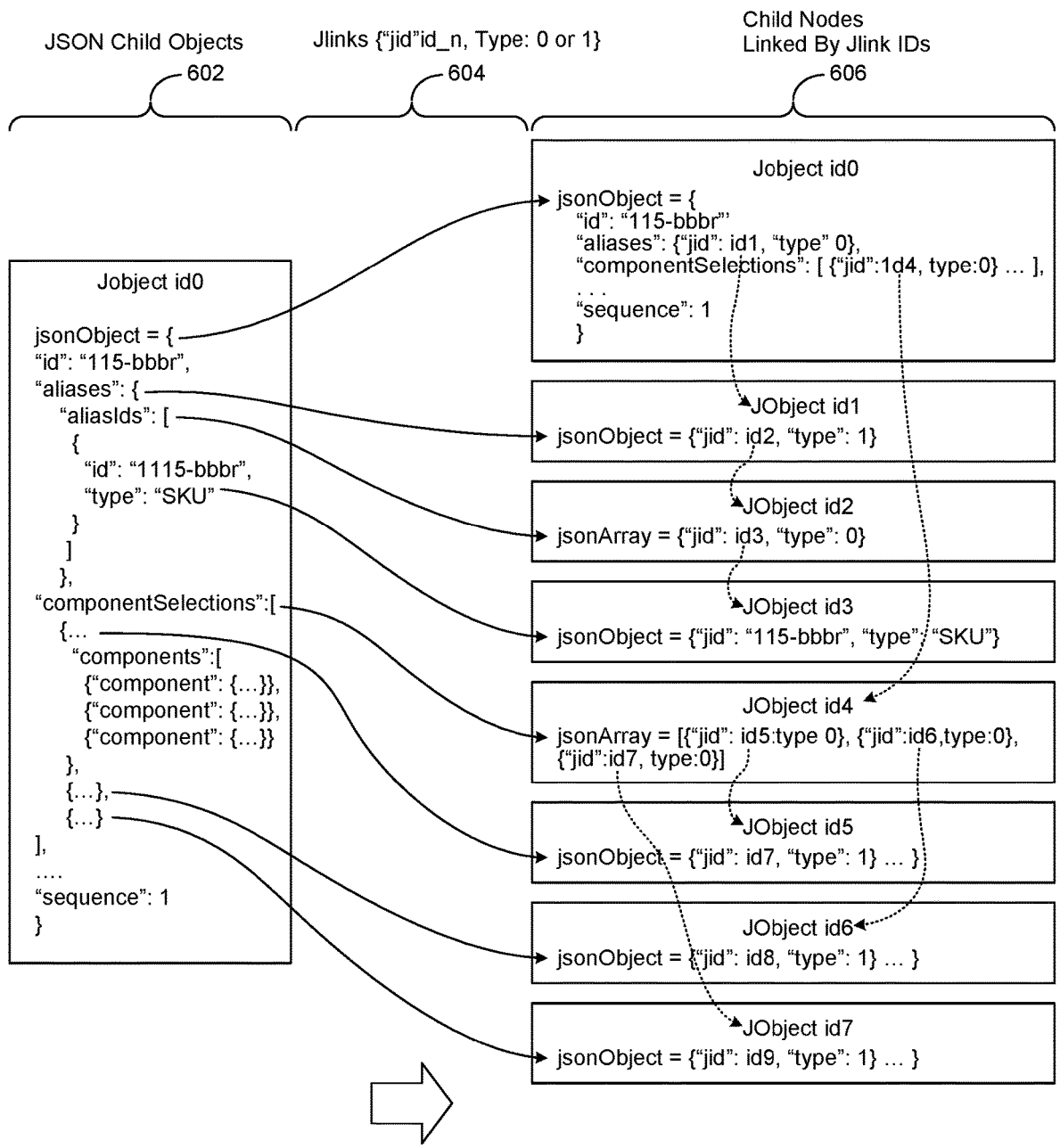
FIG. 6 shows JSON objects linked by a corresponding JSON link (Jlink)

FIG. 6 shows JavaScript Object Notation (JSON) objects linked by a corresponding JSON link (Jlink) implemented in accordance with an embodiment of the invention. In various embodiments, a JSON child object 602 within a target JSON document may be replaced with a JLink 604 that points to an associated child node 606. As used herein, a JLink broadly refers to a JSON object that contains two properties, "jid", which is a unique identifier that specifies either a JObject or a JArray, and a second property type, which specifies its type.

In various embodiments, the type of a particular JSON child node may be denoted with a property type of [1], indicating a JSON object, or a property type of [0], indicating a JSON array. In various embodiments, the properties contained in a particular JLink 604 may be implemented to show the relationship between certain JSON objects. For example, as shown in FIG. 6, the JSON child node 606 "JObject id4" is a JSON array, which contains JLinks 604 [{"jid": id5: type 0}, {"jid":id6, type:0}, {"jid":id7, type: 0}]. Accordingly, as likewise shown in FIG. 6, JLinks "id5", "id6", and "id7" respectively point to JSON child nodes "JObject id5", "JObject id6", and "JObject id7".

Figure 7A:
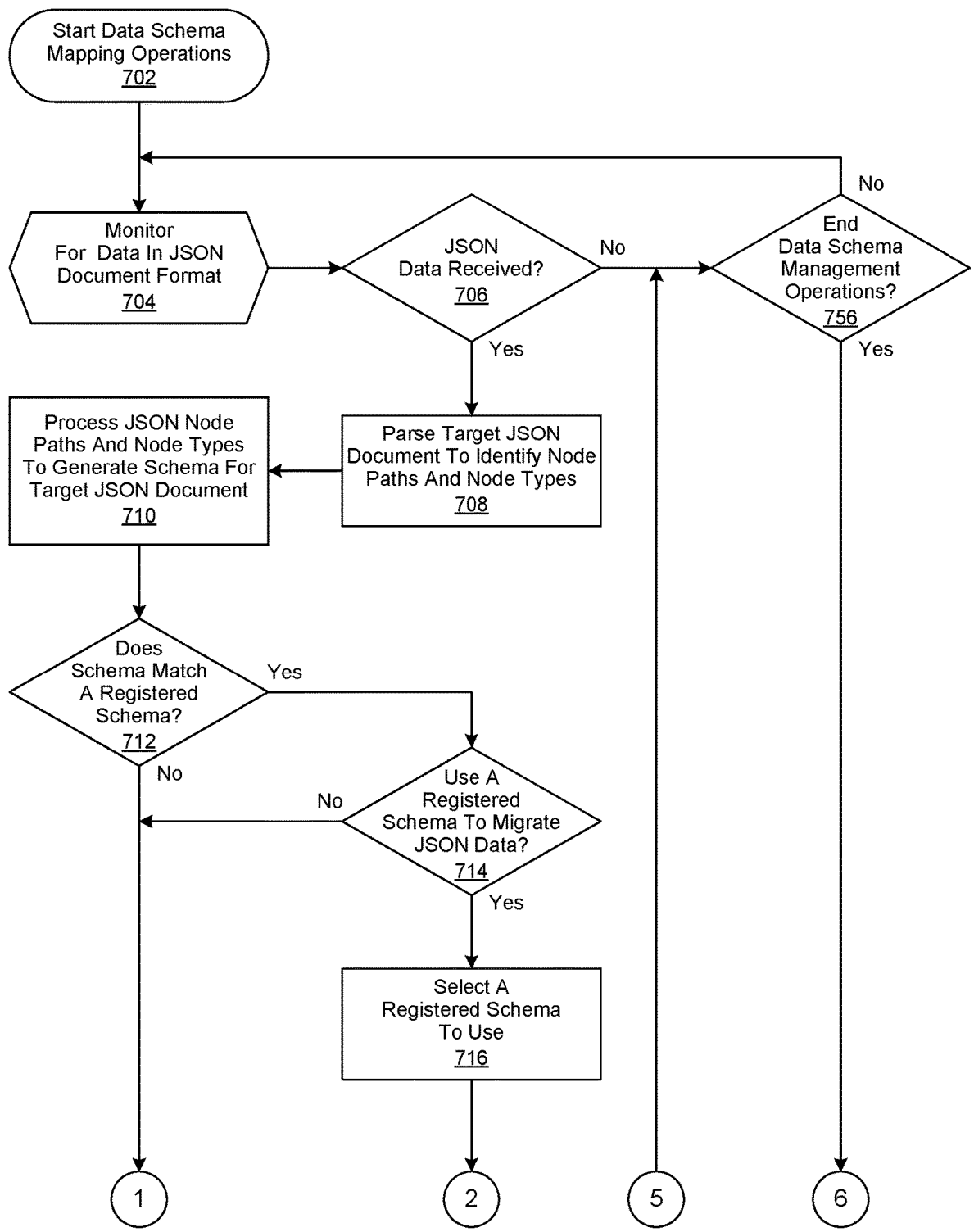
FIGS. 7a through 7c show a simplified flowchart of the performance of certain data schema mapping operations.
Figure 7B:
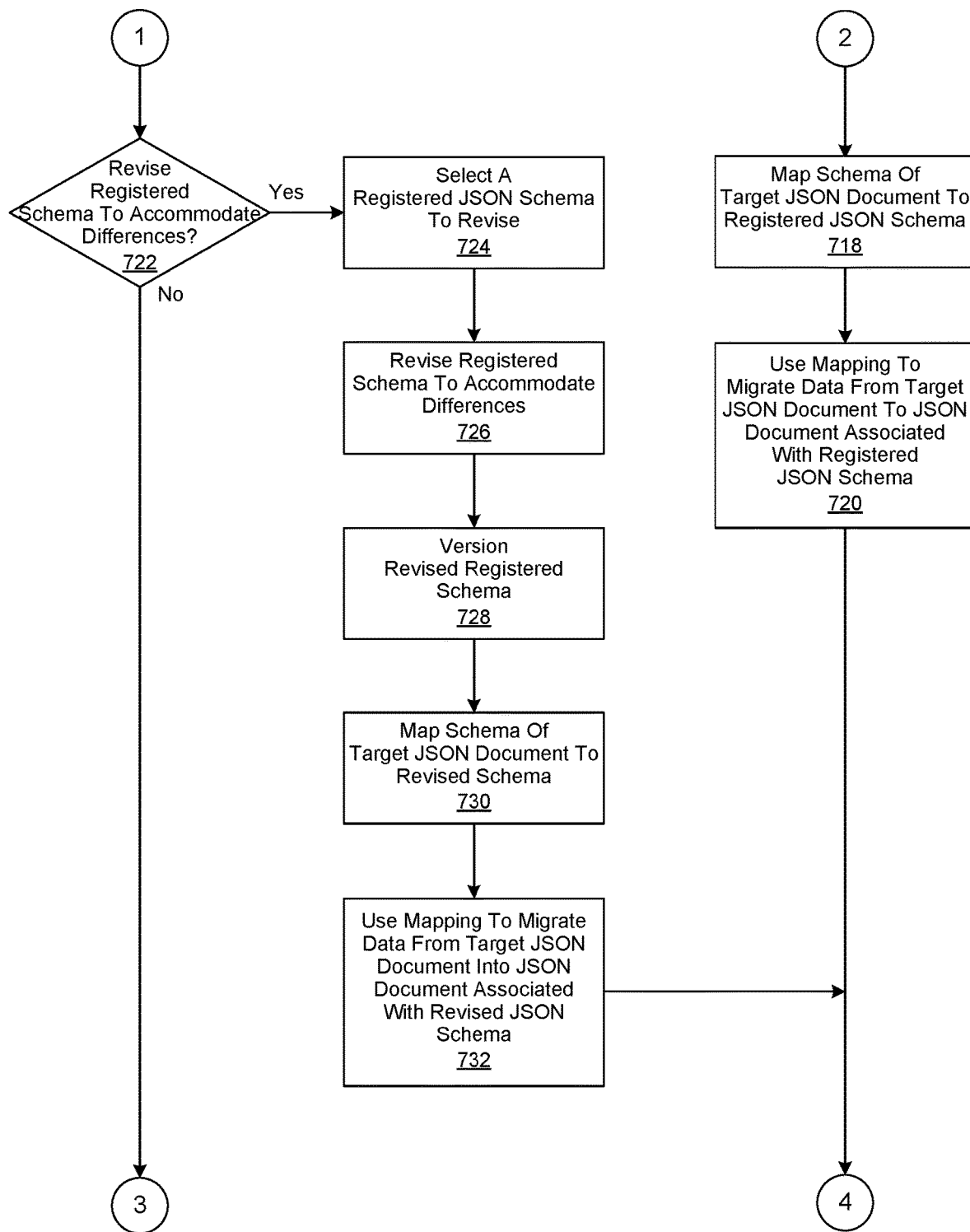
Figure 7C:
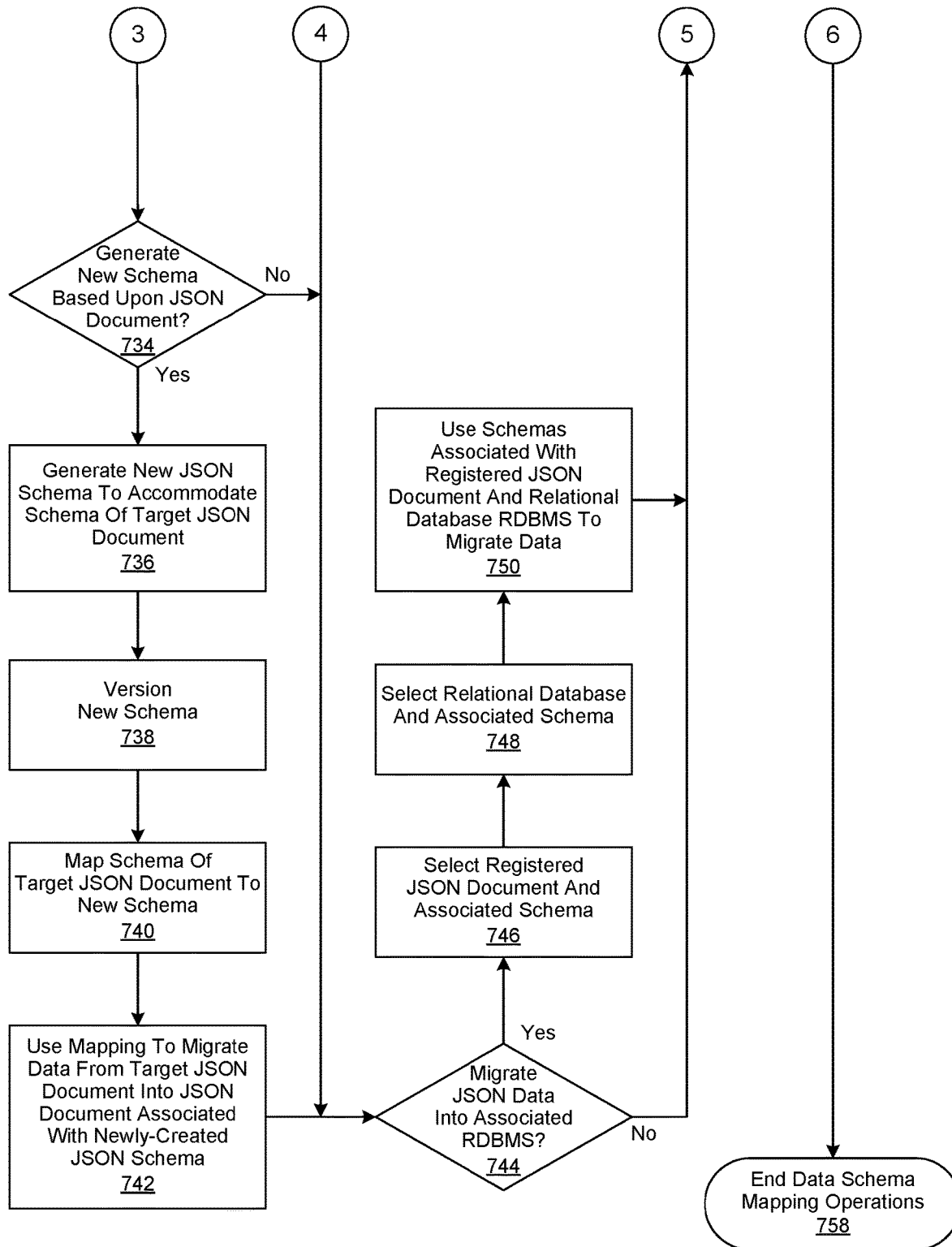

FIGS. 7a through 7c are a flowchart showing data schema mapping operations performed in accordance with an embodiment of the invention. In this embodiment, data schema mapping operations are begun in step 702, followed by ongoing monitoring operations being performed in step 704 to detect the receipt of data in the form of a target JavaScript Object Notation (JSON) document, described in greater detail herein. A determination is then made in step 706 whether data in the form of a target JSON document has been received. If not, then a determination is made in step 756 whether to end data schema mapping operations. If it is determined in step 756 not to end data schema mapping operations, then they are continued, proceeding with step 702. Otherwise, data schema mapping operations are ended in step 758.

However, if it was determined in step 706 that data in the form of a target JSON document was received, then the target JSON document is parsed in step 708 to identify its node paths and node types. The identified node paths and node types are then processed in step 710, as described in greater detail herein, to generate a target JSON document schema for the target JSON document. A determination is then made in step 712, as likewise described in greater detail herein, whether the resulting schema for the target JSON document matches a registered JSON document schema, described in greater detail herein, associated with a corresponding registered JSON document.

If so, then a determination is made in step 714 whether to migrate data contained in the target JSON document to a registered JSON document associated with a registered JSON document schema. If so, then a registered JSON document schema is selected in step 716 and the target JSON document schema corresponding to the target JSON document is mapped to it in step 718. The resulting schema mapping is then used in step 720 to migrate data contained in the target JSON document to the registered JSON document associated with the previously-selected registered JSON document schema.

However, if it was determined in step 712 that the target JSON document schema for the target JSON document does not match a registered JSON document schema, or if it was determined in step 714 not to migrate data contained in the target JSON document, then a determination is made in step 722 whether to revise an existing registered JSON document schema to accommodate deviations in the target JSON document's schema. If so, then an existing registered JSON document schema is selected in step 724 to revise and it is then revised accordingly in step 726. Thereafter, the revised registered JSON document schema is versioned in step 728, as described in greater detail herein, and the JSON document schema of the target JSON document is mapped to it in step 730. The resulting document schema mapping is then used in step 732 to migrate data contained in the target JSON document to the registered JSON document associated with the revised registered JSON document schema.

However, if it was determined in step 722 not to revise an existing registered JSON document schema, then a determination is made in step 734 whether to generate a new registered JSON document schema to accommodate the JSON document schema of the target JSON document. If so, then it is generated in step 736 and versioned in step 738. The JSON document schema of the target JSON document is then mapped to it in step 740. The resulting JSON document schema mapping is then used in step 742 to migrate data contained in the target JSON document to the registered JSON document associated with the newly-generated registered JSON data schema.

Thereafter, or after data schema mapping is completed in step 720 or in step 732, or if it was determined in step 734 not to generate a new registered JSON document schema, then a determination is made in step 744 whether to migrate data from a registered JSON document to a relational database management system (RDBMS). If so, then a registered JSON document, and its associated JSON document schema, is selected in step 746, followed by the selection of a target RDBMS, and its associated data schema, in step 748. The two schemas are then used in step 750 to migrate data from the registered JSON document to the target RDBMS. Thereafter, or if it was decided in step 744 not to migrate data from a registered JSON document to a target RDBMS, the process is continued, proceeding with step 756.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a data content mapping operation, comprising:
   receiving product information from a product supplier, the product information comprising a first document corresponding to a first data schema, the first data schema comprising an unspecified JavaScript Object Notation (JSON) schema, the unspecified JSON schema comprising a data schema having an undefined format, the undefined format being undefined by a recipient of a document conforming to the unspecified JSON schema;
   identifying a plurality of components within the first document corresponding to the first data schema, the plurality of components comprising JSON data elements, the identifying comprising constructing a node path representation of the plurality of components within the first document;
   identifying a second plurality of components corresponding to a second data schema, the second data schema comprising a defined data schema, the second data schema being associated with a services provider, the defined data schema comprising a data schema conforming to a defined format, the defined format being prescribed by the service provider, at least some of the second plurality of components being associated with a relational database; and,
   mapping a component of the document corresponding to the first data schema to a component corresponding to the second data schema.

2. The method of claim 1, wherein:
   the identifying the plurality of components within the first document comprises identifying a structure of the first document.

3. The method of claim 2, wherein:
   the node path representation comprises identified node paths and node types; and,
   the identified node paths and node types are used to generate an associated document node path listing for the first document.

4. The method of claim 3, further comprising:
   identifying parent nodes and leaf nodes within the node path using the node path representation of the plurality of components within the first document.

5. The method of claim 4, further comprising:
   replacing each of the leaf nodes with a respective link in the parent nodes.

6. The method of claim 1, further comprising:
   receiving a second document from the product supplier;
   determining whether the second document conforms to the first data schema;
   identifying differences between the first document and the second document; and
   mapping a component of the document corresponding to an identified difference of the first data schema of the second document to a component corresponding to the second data schema.

7. A system comprising:
   a processor;
   a data bus coupled to the processor; and
   a non-transitory, computer-readable storage medium embodying computer program code, the non-transitory, computer-readable storage medium being coupled to the data bus, the computer program code interacting with a plurality of computer operations and comprising instructions executable by the processor and configured for:
   receiving product information from a product supplier, the product information comprising a first document corresponding to a first data schema, the first data schema comprising a unspecified JavaScript Object Notation (JSON) schema, the unspecified JSON schema comprising a data schema having an undefined format, the undefined format being undefined by a recipient of a document conforming to the unspecified JSON schema;
   identifying a plurality of components within the first document corresponding to the first data schema, the plurality of components comprising JSON data elements, the identifying comprising constructing a node path representation of the plurality of components within the first document;
   identifying a second plurality of components corresponding to a second data schema, the second data schema comprising a defined data schema, the second data schema being associated with a services provider, the defined data schema comprising a data schema conforming to a defined format, the defined format being prescribed by the service provider, at least some of the second plurality of components being associated with a relational database; and,
   mapping a component of the document corresponding to the first data schema to a component corresponding to the second data schema.

8. The system of claim 7, wherein:
   the identifying the plurality of components within the first document comprises identifying a structure of the first document.

9. The system of claim 8, wherein:
   the node path representation comprises identified node paths and node types; and,
   the identified node paths and node types are used to generate an associated document node path listing for the first document.

10. The system of claim 9, wherein the instructions executable by the processor are further configured for:
    identifying parent nodes and leaf nodes within the node path using the node path representation of the plurality of components within the first document.

11. The system of claim 10, wherein the instructions executable by the processor are further configured for:
    replacing each of the leaf nodes with a respective link in the parent nodes.

12. The system of claim 7, wherein the instructions executable by the processor are further configured for:
    receiving a second document from the product supplier;
    determining whether the second document conforms to the first data schema;
    identifying differences between the first document and the second document; and
    mapping a component of the document corresponding to an identified difference of the first data schema of the second document to a component corresponding to the second data schema.

13. A non-transitory, computer-readable storage medium embodying computer program code, the computer program code comprising computer executable instructions configured for:

receiving product information from a product supplier, the product information comprising a first document corresponding to a first data schema, the first data schema comprising an unspecified JavaScript Object Notation (JSON) schema, the unspecified JSON schema comprising a data schema having an undefined format, the undefined format being undefined by a recipient of a document conforming to the unspecified JSON schema;

identifying a plurality of components within the first document corresponding to the first data schema, the plurality of components comprising JSON data elements, the identifying comprising constructing a node path representation of the plurality of components within the first document;

identifying a second plurality of components corresponding to a second data schema, the second data schema comprising a defined data schema, the second data schema being associated with a services provider, the defined data schema comprising a data schema conforming to a defined format, the defined format being prescribed by the service provider, at least some of the second plurality of components being associated with a relational database; and, mapping a component of the document corresponding to the first data schema to a component corresponding to the second data schema.

14. The non-transitory, computer-readable storage medium of claim 13, wherein:
the identifying the plurality of components within the first document comprises identifying a structure of the first document.

15. The non-transitory, computer-readable storage medium of claim 14, wherein:
the node path representation comprises identified node paths and node types; and,
the identified node paths and node types are used to generate an associated document node path listing for the first document.

16. The non-transitory, computer-readable storage medium of claim 15, wherein the computer executable instructions are further configured for:
identifying parent nodes and leaf nodes within the node path using the node path representation of the plurality of components within the first document.

17. The non-transitory, computer-readable storage medium of claim 16, wherein the computer executable instructions are further configured for:
replacing each of the leaf nodes with a respective link in the parent nodes.

18. The non-transitory, computer-readable storage medium of claim 13, wherein the computer executable instructions are further configured for:
receiving a second document from the product supplier;
determining whether the second document conforms to the first data schema;
identifying differences between the first document and the second document; and
mapping a component of the document corresponding to an identified difference of the first data schema of the second document to a component corresponding to the second data schema.

19. The non-transitory, computer-readable storage medium of claim 13, wherein:
the computer executable instructions are deployable to a client system from a server system at a remote location.

20. The non-transitory, computer-readable storage medium of claim 13, wherein:
the computer executable instructions are provided by a service provider to a user on an on-demand basis.

* * * * *